US008676353B2

(12) United States Patent
Matsui et al.

(10) Patent No.: US 8,676,353 B2
(45) Date of Patent: Mar. 18, 2014

(54) CONTROL SYSTEM

(75) Inventors: Toshinori Matsui, Chiyoda-ku (JP);
Madoka Baba, Chiyoda-ku (JP);
Kiyohiro Morita, Chiyoda-ku (JP)

(73) Assignee: Mitsubishi Electric Corporation,
Tokyo (JP)

( * ) Notice: Subject to any disclaimer, the term of this patent is extended or adjusted under 35 U.S.C. 154(b) by 365 days.

(21) Appl. No.: 13/217,876

(22) Filed: Aug. 25, 2011

(65) Prior Publication Data

US 2012/0053702 A1  Mar. 1, 2012

(30) Foreign Application Priority Data

Aug. 26, 2010 (JP) .................................. 2010-189260

(51) Int. Cl.
*G05B 19/18* (2006.01)
(52) U.S. Cl.
USPC .............................. 700/4; 166/302; 455/405
(58) Field of Classification Search
USPC .............................. 700/4; 166/302; 455/450
See application file for complete search history.

(56) References Cited

U.S. PATENT DOCUMENTS

| 7,590,589 | B2 * | 9/2009 | Hoffberg ........................ 705/37 |
| 8,146,669 | B2 * | 4/2012 | Mason .......................... 166/378 |
| 8,151,907 | B2 * | 4/2012 | MacDonald ................... 175/95 |
| 2007/0087756 | A1 * | 4/2007 | Hoffberg ...................... 455/450 |
| 2009/0194269 | A1 * | 8/2009 | Vinegar .......................... 166/60 |
| 2009/0194286 | A1 * | 8/2009 | Mason .......................... 166/302 |
| 2009/0194524 | A1 * | 8/2009 | Kim .............................. 219/544 |
| 2009/0200023 | A1 * | 8/2009 | Costello et al. ............... 166/260 |
| 2009/0200031 | A1 * | 8/2009 | Miller et al. .................. 166/302 |
| 2009/0272536 | A1 * | 11/2009 | Burns et al. .................... 166/302 |
| 2010/0174448 | A1 * | 7/2010 | Mueller et al. ................. 701/35 |
| 2010/0317420 | A1 * | 12/2010 | Hoffberg ......................... 463/1 |
| 2013/0085443 | A1 * | 4/2013 | Lowery et al. ................. 604/65 |

FOREIGN PATENT DOCUMENTS

| DE | 10-2009-000045 A1 | 7/2010 |
| JP | 03-286340 A | 12/1991 |
| JP | 04-307633 A | 10/1992 |

OTHER PUBLICATIONS

German Office Action, issued Dec. 18, 2012, Patent Application No. 10 2011 081 640.2.
Fault Tolerant Design; An Introduction; Elena Dubrova; Department of Microelectronics and Information Technology; Mar. 2, 2007.

* cited by examiner

*Primary Examiner* — Mohammad Ali
*Assistant Examiner* — Anthony Whittington
(74) *Attorney, Agent, or Firm* — Sughrue Mion, PLLC

(57) ABSTRACT

In the control system having plural control devices that are connected to a network, and control objects different from each other, an engine control device, a meter control device, and an AT control device, which are second control devices store a control volume computation procedure for computing the control volume of a pre-determined control among controls made by the engine control device which is a first control device, therein. The engine control device compares the control volume related to the pre-determined control computed by the engine control device with the control volume related to the pre-determined control computed by the meter control device. If a comparison result is different, the engine control device again compares the control volume with the control volume related to the pre-determined control computed by the AT control device, and controls an object to be controlled by the engine control device according to the comparison result.

13 Claims, 13 Drawing Sheets

CONTROL SYSTEM

BACKGROUND OF THE INVENTION

1. Field of the Invention

The present invention relates to a control system having a plurality of control devices that are connected to a network, and control objects to be controlled different from each other.

2. Background Art

Up to now, as a control system high in reliability, a control device illustrated in FIG. 14 is known. Referring to FIG. 14, the control device includes a main CPU (central processing unit) 51, and a sub CPU 52. The sub CPU 52 has a D.P. RAM (dual port RAM), and communicates data with the main CPU 51 through a communication line 53. The control device also includes an output stop circuit 54 that stops an output in a defective state.

In the related-art control system, in order to improve the reliability of computation, two CPUs are used in the control device as described above, and the control is executed by so-called CPU multiplexing. In this control device, the same data is input to the respective CPUs, the input results are compared by the D.P.RAM of the CPU 52, and the input results are compared with the main CPU 51 and the sub CPU 52. A defect is detected by a difference in the comparison result. When the defect is detected, the output stop circuit 54 stops the output to improve the reliability of operation (for example, refer to Patent Document 1 (JP-A-H03-286340)).

Also, up to now, a control system has been proposed which enhances the reliability as illustrated in FIG. 15. The control system in FIG. 15 includes an A-system control device 1, a B-system control device 2, and a C-system control device 3 each of which is a single control device. The A-system control device 1, the B-system control device 2, and the C-system control device 3 are coupled to each other through a signal line 5, and communicate data with each other through the signal line 5. An object to be controlled 4 is controlled by the A-system control device 1, the B-system control device 2, and the C-system control device 3.

A synchronous interrupt control is conducted among the A-system control device 1, the B-system control device 2, and the C-system control device 3 according to an interrupt control signal from an interrupt control line 6. Also, the respective computer control devices of the A-system control device 1, the B-system control device 2, and the C-system control device 3 are coupled to the object to be controlled 4 through a control I/O line 7. A system configuration control line 8 selects a device that conducts a control output from one of the computer control devices in the A-system control device 1, the B-system control device 2, and the C-system control device 3, and conducts control.

The A-system control device 1 includes an computation device 10 that conducts the main computation of the computer control device, a diagnosis device 11 that detects an computation state of the computation device 10, an output device 12 that outputs computation output data of the computation device 10, an input device 13 that inputs the computation input data to the computation device 10, an computation output switch device 14, a synchronous interrupt control device 15 that conducts the synchronous interrupt control of the computation device 10, and a communication device 16 that exchanges control data with respect to other control devices.

Likewise, the B-system control device 2 includes an computation device 20, a diagnosis device 21, an output device 22, an input device 23, an computation output switch device 24, a synchronous interrupt control device 25, and a communication device 16. The C-system control device 3 includes an computation device 30, a diagnosis device 31, an output device 32, an input device 33, an computation output switch device 34, a synchronous interrupt control device 35, and a communication device 36.

In the related-art control system configured as described above, the control devices 1, 2, and 3 are synchronized with each other through the interrupt control line 6, exchange control input data input from the control I/O line 7 with each other through the communication line 5, and after confirming that the input data is the same, implement the same computation. Then, the control outputs from the respective control devices as the operation results are subjected to majority decision to detect the defect of the computation results. When the defect is detected by the majority decision, the output is stopped by the computation output switch device of the control device to improve the reliability of the computation (for example, refer to Patent Document 2 (J2-A-H04-307633)).

PRIOR ART REFERENCE

Patent Document

[Patent Document 1] Japanese Patent Application Laid-Open No. H03-286340

[Patent Document 2] Japanese Patent Application Laid-Open No. H04-307633

However, in the related-art control system disclosed in JP-A-3-286340, because of the comparison by the two CPUs within the control device, it is impossible to determine which CPU is normal, and if one CPU is defective, the comparison result is different, and it is diagnosed that the control device per se is defective to stop the output. In this case, there arises such a problem that even if another CPU is normal, operation as the control device cannot be continued.

Also, in the related-art control system disclosed in JP-A-4-307633, because the computation results of the three control devices are used, if one control device is defective, the computation results of the three control devices are subjected to the majority decision whereby the control device that computes the computation result of the defect can be specified. However, there arises such a problem that the scale of the system becomes large such that the three control devices are conducted at the same time every time the defect is detected, and the costs are unnecessarily increased.

Furthermore, each of the control systems disclosed in JP-A-3-286340 and JP-A-4-307633 has a need to prepare the CPU and the control device only for detecting the defect, resulting in such a problem that the costs for configuring the control system are high.

SUMMARY OF THE INVENTION

The present invention has been made to solve the above-mentioned problems with the related-art device, and aims at providing a control system that specifies the control device that computes the computation result of the defect with the use of the computation results of the two control devices whereby the reliability of the control can be ensured without increasing the scale as the control system.

Also, the present invention aims at providing a control system that can ensure the reliability of the control while suppressing the unnecessary costs without preparing the CPU and the control device only for detecting the defect.

According to the present invention, there is provided a control system including a first control device and at least two second control devices, which are each connected to a network, and control objects to be controlled different from each other, wherein each of the first control device and the at least two second control devices stores a control volume computation procedure for computing a control volume related to a pre-determined control on an object to be controlled by the first control device, wherein the first control device compares the control volume related to the pre-determined control computed on the basis of the control volume computation procedure stored in the first control device with the control volume related to the pre-determined control computed on the basis of the control volume computation procedure stored in one of the at least two second control devices, and if the respective compared control volumes are identical with each other, the first control device controls the object to be controlled by the first control device on the basis of the control volumes, and wherein if the respective compared control volumes are different from each other, the first control device stops the computation by the one second control device that computes the compared control volume, computes the control volume related to the pre-determined control on the basis of the control volume computation procedure stored in the other second control device, compares the control volume related to the pre-determined control computed on the basis of the control volume computation procedure stored in the first control device with the control volume related to the pre-determined control computed by the other second control device, and controls the object to be controlled by the first control device on the basis of a comparison result.

Also, according to the present invention, there is provided a control system including a first control device and at least two second control devices, which are each connected to a network, and control objects to be controlled different from each other, wherein the first control device includes: a data transceiver unit that transmits and receives data through the network; a first storage unit that stores a first control volume computation procedure for computing a control volume related to a pre-determined control on an object to be controlled by the first control device, and control data for computing the control volume therein; a data collection unit that collects the control data for the object to be controlled by the first control device, and allows the collected control data to be stored in the first storage unit; a first control volume computation unit that computes the control volume related to the pre-determined control on the object to be controlled by the first control device on the basis of the first control volume computation procedure and the control data which are stored in the first storage unit; a comparison unit that compares the control volume related to the pre-determined control computed by the first control volume computation unit with the control volume related to the pre-determined control computed by the second control device; a control unit that controls the object to be controlled by the first control device on the basis of a comparison result by the comparison unit; and an computation implementation notification unit that notifies the second control device of implementation of computation of the control volume related to the pre-determined control and stop of the computation thereof through the network, wherein the second control device includes: a data transceiver unit that transmits and receives data through the network; a second storage unit that stores the first control volume computation procedure, and the control data therein; a control data saving unit that allows the control data received from the first control device through the network to be stored in the second storage unit; a second control volume computation unit that computes the control volume related to the pre-determined control on the basis of the first control volume computation procedure and the control data which are stored in the second storage unit; and an computation implementation determination unit that determines computation implementation and computation stop of the control volume related to the pre-determined control on the basis of the notice from an computation destination instruction unit in the first control device, wherein the first control device compares the control volume related to the pre-determined control computed on the basis of the control volume computation procedure stored in the first storage unit by the first control device with the control volume related to the pre-determined control computed on the basis of the control volume computation procedure stored in the second storage unit by one of the at least two second control devices through the comparison unit, and if the respective compared control volumes are identical with each other, the first control device controls the object to be controlled by the first control device on the basis, of the control volumes, and wherein if the respective compared control volumes are different from each other, the first control device stops the computation by the one second control device that computes the compared control volume, computes the control volume related to the pre-determined control on the basis of the control volume computation procedure stored in the other second control device through the computation implementation notification unit, compares the control volume related to the pre-determined control computed on the basis of the control volume computation procedure stored in the first control device with control volume related to the pre-determined control computed by the other second control device, and controls the object to be controlled by the first control device on the basis of a comparison result.

According to the control system of the present invention, each of the first control device and the at least two second control devices stores the control volume computation procedure for computing the control volume related to the pre-determined control on an object to be controlled by the first control device therein, the first control device compares the control volume related to the pre-determined control computed on the basis of the control volume computation procedure stored in the first control device with the control volume related to the pre-determined control computed on the basis of the control volume computation procedure stored in one of the at least two second control devices, and if the respective compared control volumes are identical with each other, the first control device controls the object to be controlled by the first control device on the basis of the control volumes, and wherein if the respective compared control volumes are different from each other, the first control device stops the computation by the one second control device that computes the compared control volume, computes the control volume related to the pre-determined control on the basis of the control volume computation procedure stored in the other second control device, compares the control volume related to the pre-determined control computed on the basis of the control volume computation procedure stored in the first control device with the control volume related to the pre-determined control computed by the other second control device, and controls the object to be controlled by the first control device on the basis of a comparison result. With this configuration, the control system that can ensure the reliability of the control can be obtained with no increase in the scale of the control system such that two microcomputers having the same function are disposed within the control device, or two other control devices for detecting the defect are provided. Also, there can be obtained the control system that ensures the reliability of the control which suppresses unnecessary costs since there is no provision of the CPU or the control device only for detecting the defect.

Also, according to the control system of the present invention, the first control device includes: a data transceiver unit that transmits and receives data through the network; a first storage unit that stores a first control volume computation procedure for computing a control volume related to a pre-determined control on an object to be controlled by the first control device, and control data for computing the control volume therein; a data collection unit that collects the control data for the object to be controlled by the first control device, and allows the collected control data to be stored in the first storage unit; a first control volume computation unit that computes the control volume related to the pre-determined control on the object to be controlled by the first control device on the basis of the first control volume computation procedure and the control data which are stored in the first storage unit; a comparison unit that compares the control volume related to the pre-determined control computed by the first control volume computation unit with the control volume related to the pre-determined control computed by the second control device; a control unit that controls the object to be controlled by the first control device on the basis of a comparison result by the comparison unit; and an computation implementation notification unit that notifies the second control device of implementation of computation of the control volume related to the pre-determined control and stop of the computation thereof through the network, and the second control device includes: a data transceiver unit that transmits and receives data through the network; a second storage unit that stores the first control volume computation procedure, and the control data therein; a control data saving unit that allows the control data received from the first control device through the network to be stored in the second storage unit; a second control volume computation unit that computes the control volume related to the pre-determined control on the basis of the first control volume computation procedure and the control data which are stored in the second storage unit; and an computation implementation determination unit that determines computation implementation and computation stop of the control volume related to the pre-determined control on the basis of the notice from an computation destination instruction unit in the first control device, wherein the first control device compares the control volume related to the pre-determined control computed on the basis of the control volume computation procedure stored in the first storage unit by the first control device with the control volume related to the pre-determined control computed on the basis of the control volume computation procedure stored in the second storage unit by one of the at least two second control devices through the comparison unit, and if the respective compared control volumes are identical with each other, the first control device controls the object to be controlled by the first control device on the basis of the control volumes, and wherein if the respective compared control volumes are different from each other, the first control device stops the computation by the one second control device that computes the compared control volume, computes the control volume related to the pre-determined control on the basis of the control volume computation procedure stored in the other second control device through the computation implementation notification unit, compares the control volume related to the pre-determined control computed on the basis of the control volume computation procedure stored in the first control device with control volume related to the pre-determined control computed by the other second control device, and controls the object to be controlled by the first control device on the basis of a comparison result. With this configuration, the control system that can ensure the reliability of the control can be obtained with no increase in the scale of the control system such that two microcomputers having the same function are disposed within the control device, or two other control devices for detecting the defect are provided. Also, there can be obtained the control system that ensures the reliability of the control which suppresses unnecessary costs since there is no provision of the CPU or the control device only for detecting the defect.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Hereinafter, preferred embodiments of a control system according to the present invention will be described with reference to the accompanying drawings. In the following respective embodiments, a case in which the control system according to the present invention is mounted on a vehicle will be described.

First Embodiment

Figure 1:
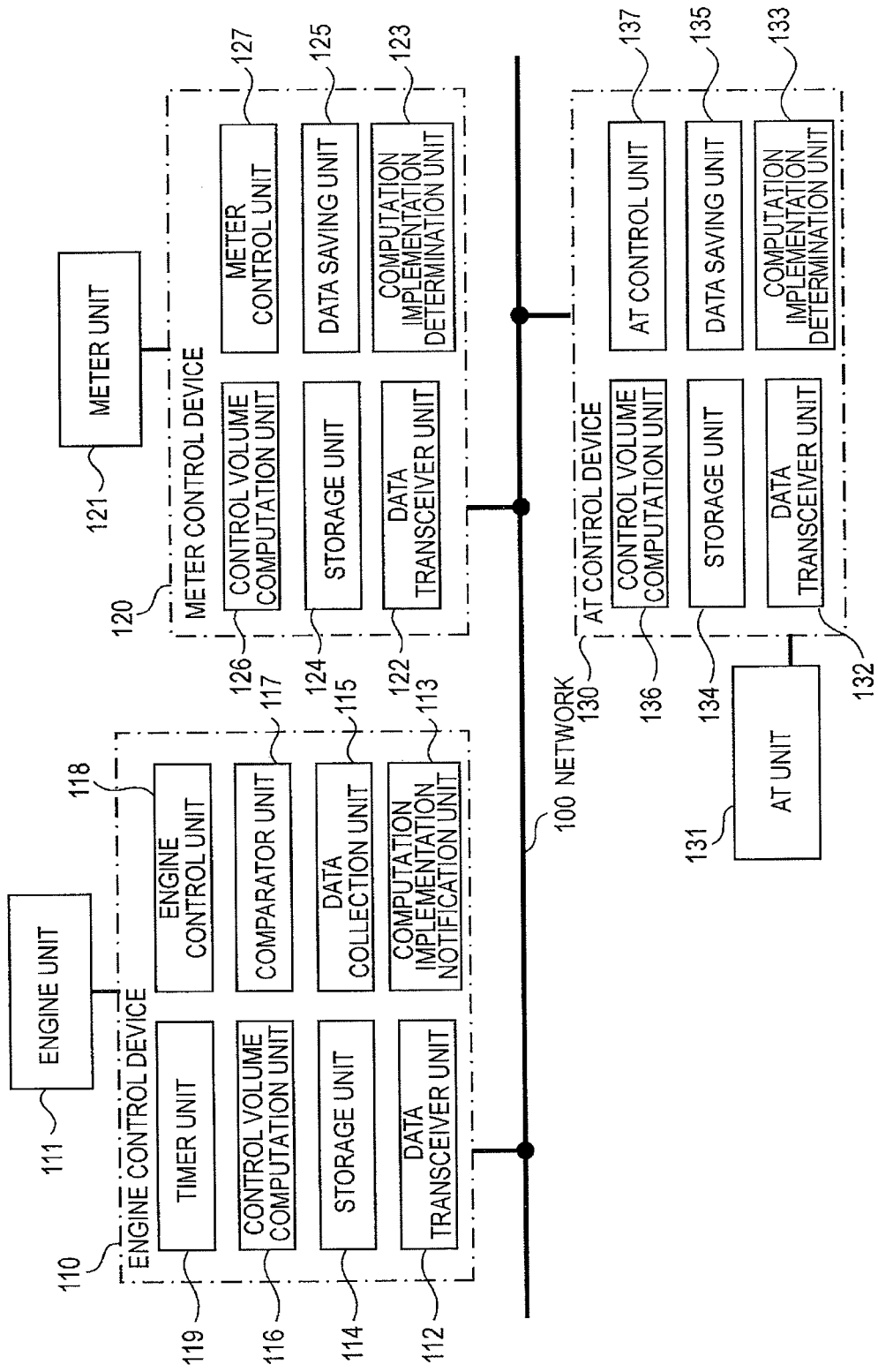
FIG. 1 is a block configuration diagram illustrating a control system according to a first embodiment of the present invention.

FIG. 1 is a block configuration diagram illustrating a control system according to a first embodiment of the present invention. Referring to FIG. 1, the control system includes an in-vehicle network (hereinafter simply referred to as "network") 100, an engine control device 110 that is a first control device, a meter control device 120 that is one second control device, and an AT (automatic transmission) control device 130 that is another second control device, which are connected to the network 100.

The second control device may include other control devices other than the meter control device 120 and the AT control device. The engine control device 110, the meter control device 120, and the AT control device 130 are connected to an engine unit 111, a meter unit 121, and an AT unit 131 each of which is connected to an object to be controlled.

Subsequently, the configuration and function of the engine control device 110 will be described. The engine control device 110 includes a data transceiver unit 112, an computation implementation notification unit 113, a storage unit 114 that is a first storage unit, a data collection unit 115, a control volume computation unit 116 that is a first control volume computation unit, a comparator unit 117, an engine control unit 118 as a control unit, and a timer unit 119. In this example, the control volume computation unit 116 is configured by a microcomputer. Also, the engine control device 110 has necessary components other than the above respective units, but since the components are directly irrelevant to the first embodiment, their description will be omitted.

The data transceiver unit 112 transmits and receives data with respect to other control devices including the meter control device 120 and the AT control device 130 which are connected to the network 100, over the network 100. The computation implementation notification unit 113 transmits a notice to implement or stop control volume computation of an engine important control (hereinafter simply referred to as "engine importance control") as a pre-determined control of the engine to be controlled, to the other control devices including the meter control device 120 and the AT control device 130 through the network 100. The storage unit 114 stores various data that will be described later.

The data collection unit 115 collects control data that is data necessary for engine control. The control volume computation unit 116 computes a control volume necessary for the engine control on the basis of a procedure that will be described later. The comparator unit 117 compares a control volume computed by the control volume computation unit 116 with control volumes received from the meter control device 120 and the AT control device 130 which are the second control devices connected to the network 100. The engine control unit 118 implements the control of an engine unit 111 on the basis of the comparison results. The timer unit 119 measures a time during which the second control device that implements the control volume computation of the engine important control implements processing.

Subsequently, the storage unit 114 disposed in the engine control device 110 that is the first control device will be described in detail.

Figure 2:
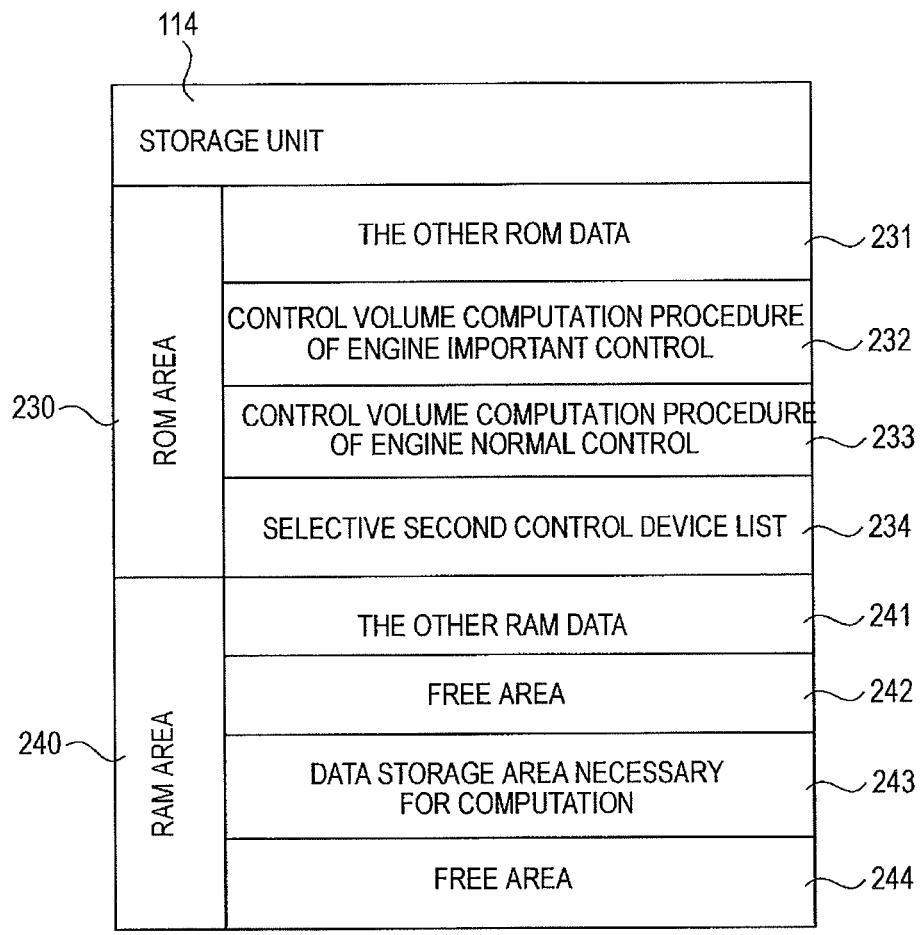
FIG. 2 is an illustrative diagram illustrating the detail of a storage unit of an engine control device in the control system according to the first embodiment of the present invention.

FIG. 2 is an illustrative diagram illustrating the detail of a storage unit of an engine control device in the control system according to the first embodiment of the present invention. Referring to FIG. 2, the storage unit 114 is classified into a ROM area 230 that cannot store data other than data stored in advance, and a RAM area 240 that enables storage of data.

The ROM area 230 includes the other ROM data 231, a control volume computation procedure 232 of the engine importance control which is a first control volume computation procedure, a control volume computation procedure 233 of the engine normal control, and a selective second control device list 234. In the following description, the other ROM data 231 is directly irrelevant to the control system according to the first embodiment of the present invention, and therefore its description will be omitted.

Figure 3:
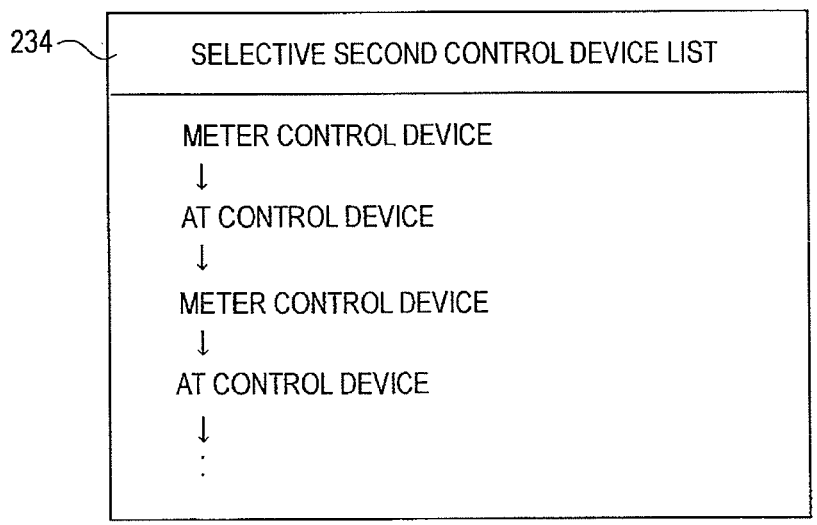
FIG. 3 is an illustrative diagram illustrating the detail of a selective second control device list recorded in the storage unit of the engine control device in the control system according to the first embodiment of the present invention.

The control volume computation procedure 232 of the engine important control is indicative of an computation procedure of the control volume related to the important control of the engine, and the control volume computation procedure 233 of the engine normal control is indicative of an computation procedure of the control volume related to the normal control of the engine. FIG. 3 is an illustrative diagram illustrating the detail of a selective second control device list recorded in the storage unit of the engine control device in the control system according to the first embodiment of the present invention. As illustrated in FIG. 3, the selective second control device list 234 represents an order of selecting the second controls devices that implement the control volume computation of the engine important control. In this example, the importance control of the engine is a control that may imperil a vehicle, a driver, and vehicle surroundings by the computation results, and requires high reliability.

Referring to FIG. 2, the RAM area 240 includes the other RAM data 241, a free area 242, a data storage area 243 necessary for computation, and a free area 244. In this example, the other RAM data 241, the free area 242, and the free area 244 are directly irrelevant to the control system according to the first embodiment of the present invention, and therefore their description will be omitted. The data storage area 243 necessary for computation stores data necessary for the control volume computation of the engine important control therein.

Subsequently, returning to FIG. 1, the configuration and function of the meter control device 120 will be described. Referring to FIG. 1, the meter control device 120 includes a data transceiver unit 122, an computation implementation determination unit 123, a storage unit 124 as a second storage unit, a data saving unit 125, a control volume computation unit 126 as a second control volume computation unit, and a meter control unit 127. In this example, the control volume computation unit 126 is configured by a microcomputer. Also, the meter control device 120 has necessary components other than the above respective units, but since the components are directly irrelevant to the control system according to the first embodiment of the present invention, their description will be omitted.

The data transceiver unit 122 transmits and receives data with respect to other control devices including the engine control device 110 and the AT control device 130 which are connected to the network 100, over the network 100. The computation implementation determination unit 123 determines implementation or stop of control volume computation of the engine important control according to a notice from the engine control device 110 through the network 100. The storage unit 124 stores various data that will be described later.

The data saving unit 125 saves data necessary for the control volume computation of the engine important control received from the engine control device 110 in the storage unit 124. The control volume computation unit 126 computes the control volume necessary for the meter control and the engine control on the basis of a procedure that will be described later. The meter control unit 127 executes the control of the meter unit 121 on the basis of the computed control volume.

Figure 4:
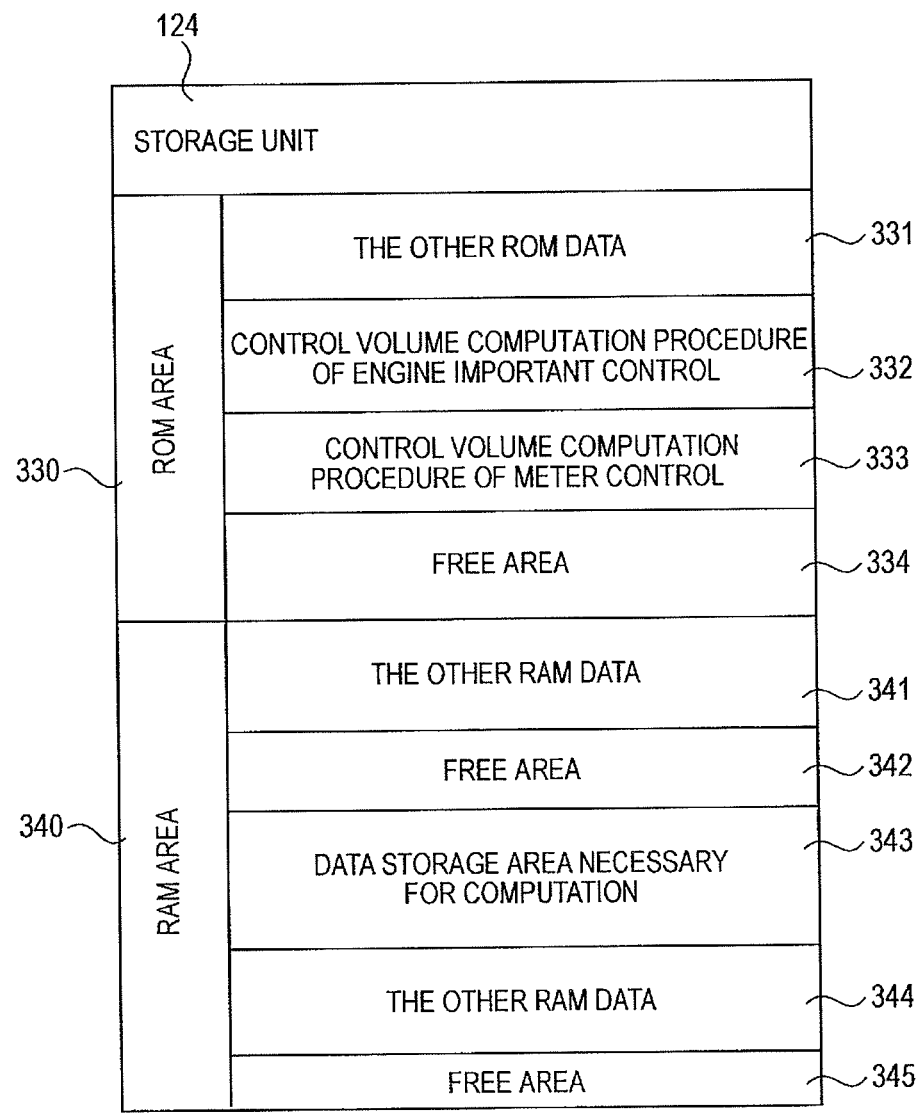
FIG. 4 is an illustrative diagram illustrating the detail of a storage unit of a meter control device in the control system according to the first embodiment of the present invention.

Subsequently, the storage unit 124 disposed in the meter control device 120 that is the second control device will be described in detail. FIG. 4 is an illustrative diagram illustrating the detail of the storage unit of the meter control device in the control system according to the first embodiment of the present invention. Referring to FIG. 4, the storage unit 124 is classified into a ROM area 330 that cannot store data other than data stored in advance, and a RAM area 340 that enables storage of data.

The ROM area 330 includes the other ROM data 331, a control volume computation procedure 332 of the engine importance control, a control volume computation procedure 333 of the meter control, and a free area 334. In the following description, the other ROM data 331 and the free area 334 are directly irrelevant to the control system according to the first embodiment of the present invention, and therefore their description will be omitted.

The control volume computation procedure 232 of the engine important control is representative of the control volume computation procedure of the engine important control, and stores the same contents as those of the control volume computation procedure 232 of the above-mentioned engine important control. The control volume computation procedure 333 of the meter control is representative of an computation procedure of the control volume related to the meter control.

Subsequently, the RAM area 340 includes the other RAM data 341, a free area 342, a data storage area 343 necessary for computation, the other RAM data 344, and a free area 345. In this example, the other RAM data 341, the free area 342, and the other RAM data 344, and the free area 345 are directly irrelevant to the control system according to the first embodiment of the present invention, and therefore their description will be omitted. The data storage area 343 necessary for computation stores data necessary for the control volume computation of the engine important control therein.

Subsequently, returning to FIG. 1, the configuration and function of the AT control device 130 will be described. The AT control device 130 includes a data transceiver unit 132, an computation implementation determination unit 133, a storage unit 134 as the second storage unit, a data saving unit 135, a control volume computation unit 136 as the second control volume computation unit, and an AT control unit 137. In this example, the control volume computation unit 136 is configured by a microcomputer. Also, the AT control device 130 has necessary components other than the above respective units, but since the components are directly irrelevant to the control system according to the first embodiment of the present invention, their description will be omitted.

The data transceiver unit 132 transmits and receives data with respect to other control devices including the engine control device 110 and the meter control device 120 which are connected to the network 100, over the network 100. The computation implementation determination unit 133 determines implementation or stop of the control volume computation of the engine important control according to a notice from the engine control device 110 through the network 100. The storage unit 134 stores various data that will be described later therein.

The data saving unit 135 saves data necessary for the control volume computation of the engine important control received from the engine control device 110 in the storage unit 134. The control volume computation unit 136 computes the control volume necessary for the AT control and the engine control on the basis of a procedure that will be described later. The AT control unit 137 executes the control of the AT unit 131 on the basis of the computed control volume.

Referring to FIG. 1, the data transceiver unit 112, the data transceiver unit 122, and the data transceiver unit 132 may be configured by the same components. Likewise, referring to FIG. 1, the computation implementation determination unit 123 and the computation implementation determination unit 133 may be configured by the same components.

Figure 5:
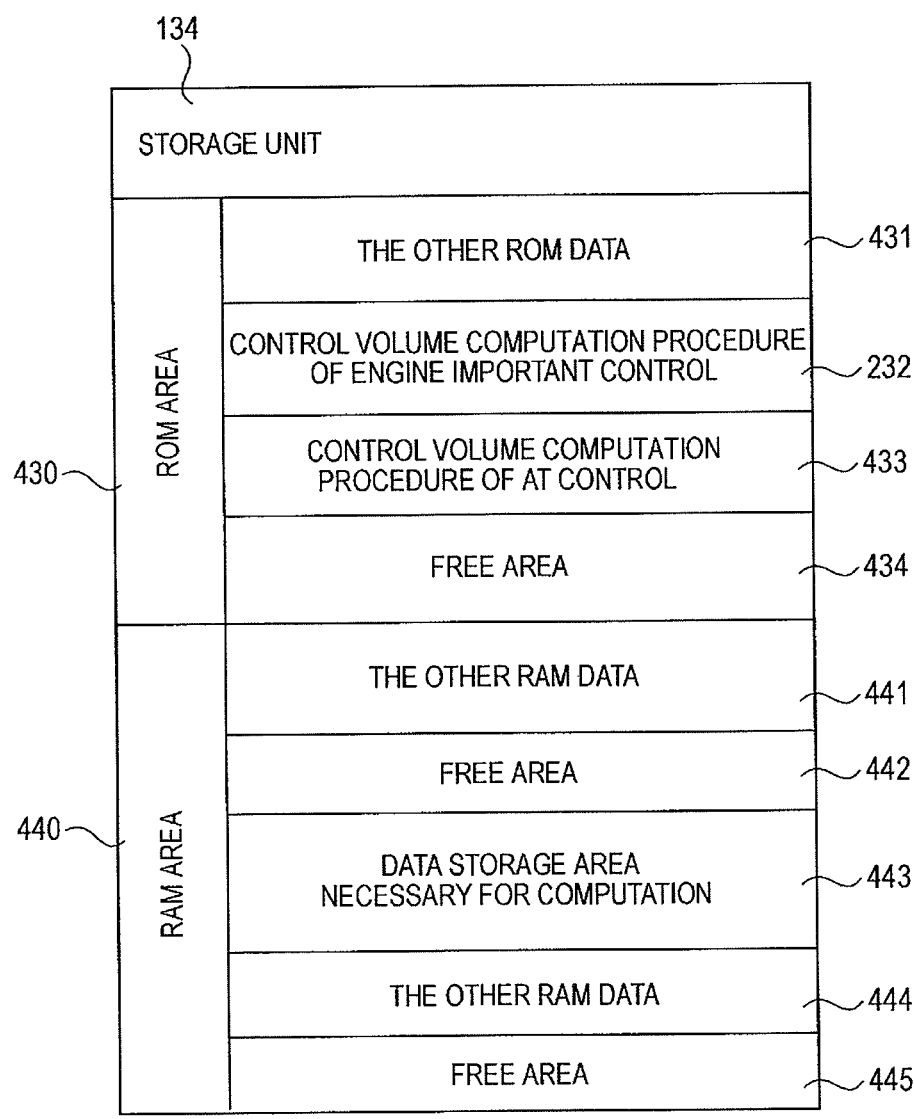
FIG. 5 is an illustrative diagram illustrating the detail of a storage unit of an AT control device in the control system according to the first embodiment of the present invention.

Subsequently, the storage unit 134 of the AT control device 130 will be described in detail. FIG. 5 is an illustrative diagram illustrating the detail of the storage unit of the AT control device in the control system according to the first embodiment of the present invention. Referring to FIG. 5, the storage unit 134 is classified into a ROM area 430 that cannot store data other than data stored in advance, and a RAM area 440 that enables storage of data.

The ROM area 430 includes the other ROM data 431, a control volume computation procedure 232 of the engine importance control, a control volume computation procedure 433 of the AT control, and a free area 434. In the following description, the other ROM data 431 and the free area 434 are directly irrelevant to the control system according to the first embodiment of the present invention, and therefore their description will be omitted.

The control volume computation procedure 433 of the AT control is representative of the computation procedure of the control volume related to the control of the AT. The control volume computation procedure 232 of the engine important control is representative of the computation procedure of the control volume of the engine important control, and stores the same contents as those of the control volume computation procedure 232 of the engine important control in the storage unit 114 of the engine control device 110, and the control volume computation procedure 232 of the engine important control in the storage unit 124 of the meter control device 120.

Also, the RAM area 440 includes the other RAM data 441, a free area 442, a data storage area 443 necessary for computation, the other RAM data 444, and a free area 445. In this example, the other RAM data 441, the free area 442, the other RAM data 444, and the free area 445 are directly irrelevant to the control system according to the first embodiment of the present invention, and therefore their description will be omitted. The data storage area 443 necessary for computation stores data necessary for the control volume computation of the engine important control therein.

Subsequently, the operation of the engine control device 110 will be described. The engine control device 110 implements important processing related to the control volume computation of the engine important control, and normal processing other than the important processing. The important processing is repetitively executed if necessary. The normal processing is lower in priority than the important processing, and implemented in a time when the important processing is not implemented. Since the normal processing is directly irrelevant to the control system according to the first embodiment of the present invention, its description will be omitted.

Figure 6:
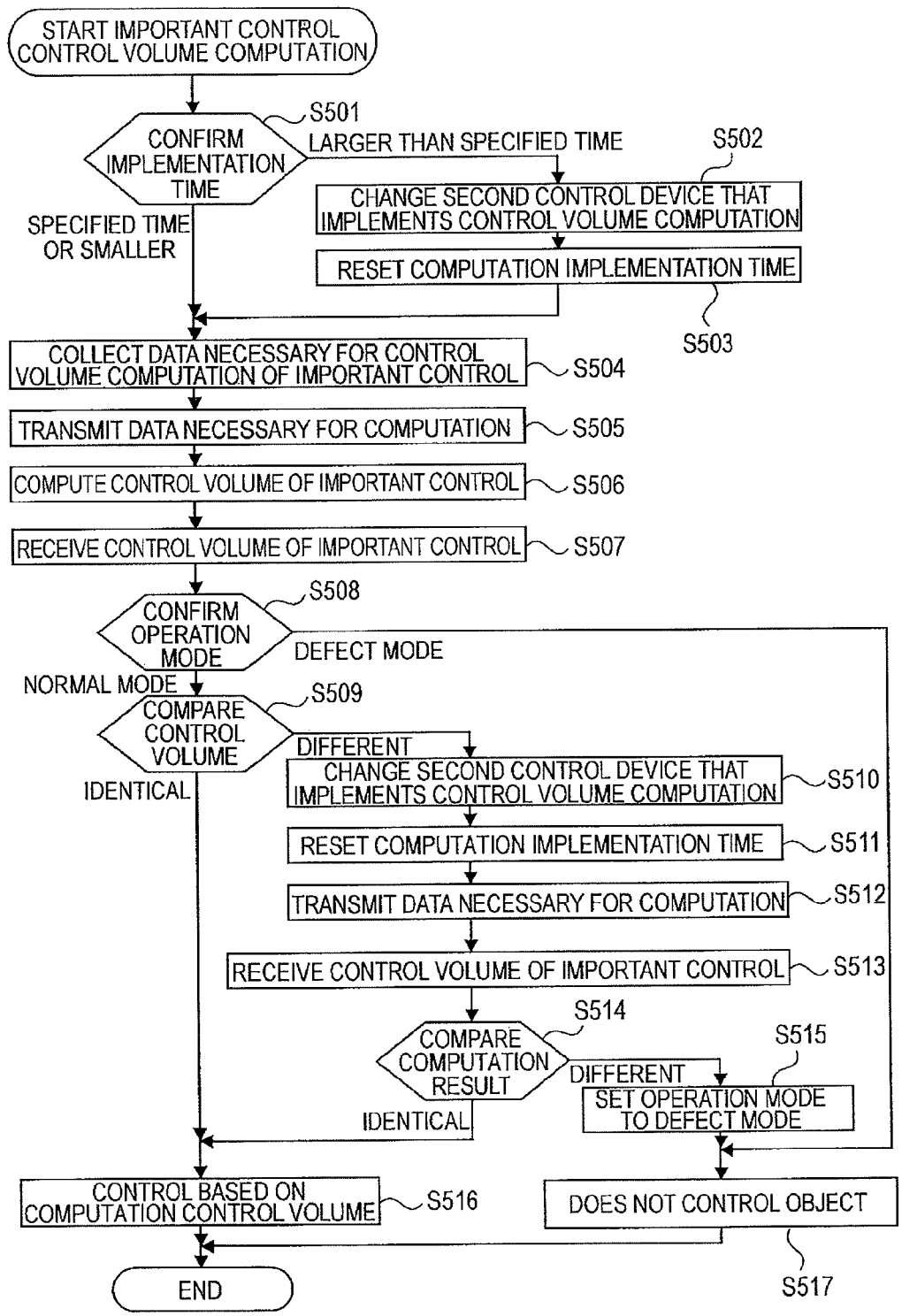
FIG. 6 is a flowchart illustrating the operation of the engine control device in the control system according to the first embodiment of the present invention.

Hereinafter, a flow of the important processing in the engine control device will be described. FIG. 6 is a flowchart illustrating the operation of the engine control device in the control system according to the first embodiment of the present invention. The flowchart illustrated in FIG. 6 is implemented for each of the important processing related to the engine important control.

Referring to FIG. 6, in Step S501, the timer unit 119 confirms an computation implementation time of the second control device that implements the control volume computation of the engine important control selected at that time, for example, the meter control device 120 or the AT control device 130. If the computation implementation time is a specified time or lower, the processing is advanced to Step S504 whereas if the computation implementation time is larger than specified time, the processing is advanced to Step S502.

In Step S502, the computation implementation notification unit 113 notifies the second control device that has implemented the control volume computation of the engine important control up to now of stop of the control volume computation of the engine important control, and notifies the second control device to be selected subsequently according to the selective second control device list 234 saved in The storage unit 114 of the implementation of the control volume computation of the engine important control. That is, the computation implementation notification unit 113 changes the second control device that implements the control volume computation on the basis of an order of the selective second control device list illustrated in FIG. 3.

In Step S503, the timer unit 119 resets the computation implementation time of the second control device selected in Step S502 to an initial value.

In Step S504, the data collection unit 115 collects data necessary for the control volume computation of the engine important control, and stores the collected data in the data storage area 243 necessary for the computation of the storage unit 114.

In Step S505, the data transceiver unit 112 transmits data necessary for the control volume computation of the engine important control to the selected second control device that implements the control volume computation of the engine important control. In this example, the timer unit 119 starts the computation implementation time measurement of the selected second control device. The measurement of the computation time is implemented by addition the computation time to the time measured up to now.

In Step S506, the control volume computation unit 116 computes the control volume of the engine important control on the basis of data necessary for the control volume computation of the engine important control stored in the data storage area 243 necessary for computation in the storage unit 114, and the control volume computation procedure 232 of the engine important control.

In Step S507, the data transceiver unit 112 receives the control volume of the engine important control transmitted from the second control device that implements the control volume computation of the engine important control. In this example, the timer unit 119 stops the computation implementation time measurement of the selected second control device.

In Step S508, the comparator unit 117 also confirms an operation mode of the engine control device 110 at this time. If the operation mode is a normal mode, the processing is advanced to Step S509, and if the operation mode is a defect mode, the processing is advanced to Step S517. In this example, the normal mode indicates that no defect is detected up to now, and the defect mode indicates that the defect of the engine control device 110 per se is detected.

In Step S509, the comparator unit 117 compares the control volume of the engine important control computed in Step S506 with the control volume of the engine important control received in Step S507. If identical, the processing is advanced to Step S516, and if not identical, the processing is advanced to Step S510.

In Step S510, the computation implementation notification unit 113 notifies the second control device that has implemented the control volume computation of the engine important control up to now of stop of the control volume computation of the engine important control, and notifies the second control device to be selected subsequently according to the selective second control device list 234 saved in the storage unit 114 of the implementation of the control volume computation of the engine important control. That is, the computation implementation notification unit 113 changes the second control device that implements the control volume computation on the basis of an order of the selective second control device list illustrated in FIG. 3.

In Step S511, the timer unit 119 resets the computation implementation time of the second control device selected in Step S510 to an initial value.

In Step S512, the data transceiver unit 112 transmits data necessary for the control volume computation of the engine important control to the selected second control device that implements the control volume computation of the engine important control. In this example, the timer unit 119 starts the computation implementation time measurement of the above-mentioned selected second control device. The measurement of the computation time is implemented by addition the computation time to the time measured up to now.

In Step S513, the data transceiver unit 112 receives the control volume of the engine important control transmitted from the selected second control device that implements the control volume computation of the important control. In this example, the timer unit 119 stops the computation implementation time measurement of the selected second control device.

In Step S514, the comparator unit 117 compares the control volume of the engine important control computed in Step S506 with the control volume of the engine important control received in Step S513. If identical, the processing is advanced to Step S516, and if not identical, the processing is advanced to Step S515.

In Step S515, the comparator unit 117 determines that the engine control device 110 per se is defective if the comparison result is not identical again, and sets the operation mode of the engine control device 110 to the defect mode.

In Step S517 subsequent to Step S515, the engine control unit 118 does not implement the control of the engine unit 111.

On the other hand, in Step S516, the engine control unit 118 in the engine control device 110 implements the control of the engine unit 111 on the basis of the control volume of the engine important control which has become identical with the received control volume of the engine important control.

Subsequently, the operation of the meter control device 120 that is the second control device will be described. Referring to FIGS. 1 and 4, the meter control device 120 implements necessary normal processing necessary for controlling the meter unit 121 on the basis of the control volume computation procedure 333 of the meter control stored in the storage unit 124. However, when the second control device that implements the control volume computation of the engine important control is selected, that is, designated by the engine control device 110, if the data transceiver unit 122 receives data necessary for calculation of the control volume of the engine important control, the meter control device 120 stores the received data in the data storage area 343 necessary for computation of the storage unit 124. Then, the meter control device 120 computes the control volume of the engine important control on the basis of data necessary for the control volume computation of the engine important control stored in the storage unit 124, and the control volume computation procedure 232 of the engine important control. Then, the meter control device 120 transmits the computed control volume of the engine important control to the engine control device 110. Those processing related to the control volume of the engine important control is implemented with highest priority.

If the computation implementation determination unit 123 of the meter control device 120 receives the implementation notice of the control volume computation of the important control from the computation implementation notification unit 113 of the engine control device 110, the computation implementation determination unit 123 determines that the meter control device 120 is designated as the second control device that implements the control volume computation of the engine important control. If the computation implementation determination unit 123 receives the stop notice, the computation implementation determination unit 123 determines that the meter control device 120 is not designated as the second control device.

Subsequently, the operation of the AT control device 130 will be described. Referring to FIGS. 1 and 5, the AT control device 130 implements the normal processing necessary for controlling the AT unit 131 on the basis of the control volume computation procedure 433 of the AT control stored in the storage unit 134. However, when the second control device that implements the control volume computation of the important control is selected, that is, designated by the engine control device 110, if the data transceiver unit 132 receives, from the engine control device 110, data necessary for computation of the control volume of the engine important control, the AT control device 130 stores the received data in the data storage area 443 necessary for computation of the storage unit 134. The AT control device 130 computes the control volume related to the engine important control on the basis of data necessary for the control volume computation of the engine important control stored in the storage unit 134, and the control volume computation procedure 232 of the engine important control. Then, the AT control device 130 transmits the computed control volume of the engine important control to the engine control device 110 through the data transceiver unit 132. Those processing related to the control volume of the engine important control is implemented with highest priority.

If the computation implementation determination unit 133 of the AT control device 130 receives the implementation notice of the control volume computation of the important control from the computation implementation notification unit 113 of the engine control device 110, the computation implementation determination unit 133 determines that the AT control device 130 is designated as the second control device that implements the control volume computation of the engine important control. If the computation implementation determination unit 133 receives the stop notice, the computation implementation determination unit 133 determines that the AT control device 130 is not designated as the second control device.

Subsequently, referring to a flowchart of FIG. 6, a description will be given of the operation of the control system when the control volume computation unit 116 of the engine control device 110, the control volume computation unit 126 of the meter control device 120, and the control volume computation unit 136 of the AT control device 130 are not defective, and the control volume related to the engine important control is accurately computed. First, it is assumed that the meter control device 120 is designated as the second control device that implements the control volume computation of the engine important control. Also, it is assumed that the operation mode of the engine control device 110 is the normal mode indicating that no defect is detected up to now.

When the important processing related to the control volume computation of the engine important control starts, the timer unit 119 of the engine control device 110 confirms the computation implementation time of the selected meter control device 120 in Step S501. In this example, it is determined that the computation implementation time is a specified value or lower.

Subsequently, in Step S504, the data collection unit 115 of the engine control device 110 collects data necessary for the control volume computation of the engine important control, and stores the collected data in the data storage area 243 necessary for computation of the storage unit 114.

Subsequently, in Step S505, the data transceiver unit 112 transmits data necessary for the control volume computation of the engine important control to the meter control device 120. In this example, the timer unit 119 starts the computation implementation time measurement of the meter control device 120. On the other hand, since the data transceiver unit 122 receives data necessary for the control volume computation of the engine important control from the engine control device 110, the meter control device 120 stores the received data in the data storage area 343 necessary for computation of the storage unit 124.

Subsequently, in Step S506, the control volume computation unit 116 of the engine control device 110 computes the control volume of the engine important control on the basis of data necessary for the control volume computation of the engine important control stored in the storage unit 114, and the control volume computation procedure 232 of the engine important control. On the other hand, the meter control device 120 computes the control volume of the engine important control on the basis of data necessary for the control volume computation related to the engine important control stored in the storage unit 124, and the control volume computation procedure 232 of the engine important control. Then, the data transceiver unit 122 transmits the control volume of the engine important control to the engine control device 110.

Subsequently, in Step S507, the data transceiver unit 112 receives the control volume of the engine important control transmitted from the meter control device 120. In this example, the timer unit 119 stops the computation implementation time measurement of the meter control device 120.

Subsequently, in Step S508, the comparator unit 117 confirms the operation mode of the engine control device 110. In this example, the operation mode is the normal mode.

Subsequently, in Step S509, the comparator unit 117 compares the control volume of the engine important control, which is computed by the comparator unit 117 per se with the control volume of the engine important control received from the meter control device 120. In this example, the comparison results are the same.

Subsequently, in Step S516, the engine control unit 118 executes the control of the engine unit 111 on the basis of the same control volume of the engine important control.

Through the above operation of the control system, the control volume computation of the engine important control is also implemented in the meter control device 120 selected as the second control device, and the meter control device 120 compares the control volumes with each other. If the comparison result is identical, the meter control device 120 can continue the control of the engine unit 111 on the basis of the same control volume.

Subsequently, referring to a flowchart of FIG. 6, a description will be given of the operation of the control system when the control volume computation unit 116 of the engine control device 110, the control volume computation unit 126 of the meter control device 120, and the control volume computation unit 136 of the AT control device 130 are not defective, and the control volume related to the engine important control is accurately computed as described above, in the case where the computation implementation time of the meter control device 120 that implements the control volume computation of the engine important control exceeds the specified time.

First, when the important processing related to the control volume computation of the engine important control starts, the timer unit 119 of the engine control device 110 confirms the computation implementation time of the selected meter control device 120 in Step S501. In this example, it is determined that the computation implementation time exceeds the specified time.

Then, in Step S502, the computation implementation notification unit 113 in the engine control device 110 notifies the meter control device 120 of the stop of the control volume computation of the engine important control, and notifies the AT control device 130 to be selected next according to the selective second control device list 234 illustrated in FIG. 3 saved in the storage unit 114 of the implementation of the control volume computation of the engine important control. In this example, the computation implementation determination unit 123 of the meter control device 120 receives a notice to stop the control volume computation of the engine important control from the computation implementation notification unit 113 of the engine control device 110. Therefore, the computation implementation determination unit 123 determines that the meter control device 120 is not designated as the second control device that implements the control volume computation of the engine important control. Also, the computation implementation determination unit 133 of the AT control device 130 receives a notice to implement the control volume computation of the engine important control from the computation implementation notification unit 113 of the engine control device 110. Therefore, the computation implementation determination unit 133 determines that the AT control device 130 is designated as the second control device that implements the control volume computation of the engine important control.

Subsequently, in Step S503, the timer unit 119 resets the computation implementation time of the AT control device 130 to an initial value.

Then, in Step S504, the data collection unit 115 collects data necessary for the control volume computation of the engine important control, and stores the collected data in the data storage area 243 necessary for computation of the storage unit 114 therein.

Subsequently, the processing is advanced to Step S505, and the data transceiver unit 112 in the engine control device transmits data necessary for the control volume computation of the engine important control to the AT control device 130. In this example, the timer unit 119 starts the computation implementation time measurement of the AT control device 130. On the other hand, since the data transceiver unit 132 receives data necessary for the control volume computation of the engine important control from the engine control device 110, the AT control device 130 stores the received data in the data storage area 443 necessary for computation of the storage unit 134.

Then, in Step S506, the control volume computation unit 116 in the engine control device 110 computes the control volume of the engine important control on the basis of data necessary for the control volume computation of the engine important control, which is stored in the storage unit 114, and the control volume computation procedure 232 of the engine important control. On the other hand, the AT control device 130 computes the control volume of the engine important control on the basis of data necessary for the control volume computation of the engine important control, which is stored in a storage unit 144, and the control volume computation procedure 232 of the engine important control. Then, the AT control device 130 transmits the control volume of the engine important control to the engine control device 110 through the data transceiver unit 132.

Subsequently, in Step S507, the data transceiver unit 112 in the engine control device 110 receives the control volume of the engine important control transmitted from the AT control device 130. In this example, the timer unit 119 stops the computation implementation time measurement of the AT control device 130.

Subsequently, the processing is advanced to Steps S508, S509, and S516. However, those steps are the same processing contents as those described above, and therefore their description will be omitted.

Through the above operation of the control system, the control volume computation of the engine important control is also implemented by the meter control device 120 selected as the second control device, and if the processing time exceeds a specified value, the meter control device 120 is replaced with the AT control device 130 that is another second control device to compute the control volume computation of the engine important control. The control volumes are compared with each other, and if a comparison result is identical, the control of the engine unit 111 can be continued on the basis of the identical control volume.

Subsequently, referring to a flowchart of FIG. 6, a description will be given of the operation of the control system when the control volume computation unit 116 of the engine control device 110 is defective, and the control volume of the engine important control is not accurately computed. First, it is assumed that the meter control device 120 is designated as the second control device that implements the control volume computation of the engine important control. Also, it is assumed that the operation mode of the engine control device 110 is the normal mode indicating that no defect is detected up to now.

The processing of the engine control device 110 is advanced to Steps S501, S504, S505, S506, S507, and S508. Those processing is the same as that in the above-mentioned case where there is no defect, and therefore their description will be omitted.

Subsequently, in Step S509, the comparator unit 117 in the engine control device 110 compares the control volume of the engine important control computed by the comparator unit 117 per se with the control volume of the engine important control received from the meter control device 120. In this example, because the control volume computation unit 116 is defective, and the control volume of the engine important control is not accurately computed, the comparison result is different.

Then, in Step S510, the computation implementation notification unit 113 of the engine control device 110 notifies the meter control device 120 of the stop of the control volume computation of the engine important control, and notifies the AT control device 130 to be selected next according to the selective second control device list 234 saved in the storage unit 114 of the implementation of the control volume computation of the engine important control. In this example, the computation implementation determination unit 123 of the meter control device 120 receives a notice to stop the control volume computation of the engine important control from the computation implementation notification unit 113 of the engine control device 110. Therefore, the computation implementation determination unit 123 determines that the meter control device 120 is not designated as the second control device that implements the control volume computation of the engine important control. On the other hand, the computation implementation determination unit 133 of the AT control device 130 receives a notice to implement the control volume computation of the engine important control from the computation implementation notification unit 113 of the engine control device 110. Therefore, the computation implementation determination unit 133 determines that the AT control device 130 is designated as the second control device that implements the control volume computation of the engine important control.

Subsequently, the processing is advanced to Step S511, and the timer unit 119 resets the computation implementation time of the AT control device 130 to an initial value. Then, in Step S512, the data transceiver unit 112 transmits data necessary for the control volume computation of the engine important control to the AT control device 130. In this example, the timer unit 119 starts the computation implementation time measurement of the AT control device 130. On the other hand, since the data transceiver unit 132 receives data necessary for the control volume computation of the engine important control from the engine control device 110, the AT control device 130 stores the received data in the data storage area 443 necessary for computation of the storage unit 134. Then, the AT control device 130 computes the control volume of the engine important control on the basis of data necessary for the control volume computation of the engine important control, which is stored in the storage unit 134, and the control volume of the engine important control. Then, the AT control device 130 transmits the control volume of the engine important control to the engine control device 110 through the data transceiver unit 132.

Subsequently, in Step S513, the data transceiver unit 112 in the engine control device 110 receives the control volume of the engine important control transmitted from the AT control device 130. In this example, the timer unit 119 stops the computation implementation time measurement of the AT control device 130.

Then, in Step S514, the comparator unit 117 in the engine control device 110 compares the control volume of the engine important control computed by the comparator unit 117 per se with the control volume of the engine important control received from the AT control device 130. In this example, because the control volume computation unit 116 is defective, and the control volume of the engine important control is not accurately computed, the comparison result is again different.

Subsequently, in Step S515, the comparator unit 117 determines that the control device of the engine control device 110 is defective because the comparison result is again different, and sets the operation mode of the engine control device 110 to the defect mode.

Then, in Step s517, the engine control unit 118 does not execute the control of the engine unit 111.

Through the above operation of the control system, the control volume computation of the engine important control is also implemented by the meter control device 120 selected as the second control device, and the control volumes are compared with each other. If a comparison result is different, the control volume computation is implemented by the AT control device 130 that is another second control device, and the control volumes are again compared with each other to specify the defective control device. If the control device is the control device of itself, the control of the engine unit 111 can be prevented from being executed.

Subsequently, referring to a flowchart of FIG. 6, a description will be given of the operation of the control system when the control volume computation unit 126 of the meter control device 120 is defective, and the control volume computation of the engine important control is not accurately computed. First, it is assumed that the meter control device 120 is designated as the second control device that implements the control volume computation of the engine important control. Also, it is assumed that the operation mode of the engine control device 110 is the normal mode indicating that no defect is detected up to now.

The processing of the engine control device 110 is advanced to Steps S501, S504, S505, S506, S507, S508, S509, S510, S511, S512, and S513. In this situation, in Step S510, the AT control device 130 is selected as the second control device. Those processing is the same as that in the above-mentioned case where the control volume computation unit 116 of the engine control device 110 is defective, and therefore their description will be omitted.

Subsequently, in Step S514, the comparator unit 117 compares the control volume of the engine important control computed by the comparator unit 117 per se with the control volume of the engine important control received from the AT control device 130. In this example, because the control volume computation unit 116 of the engine control device 110 and the control volume computation unit 136 of the AT control device 130 are not defective, the control volume of the engine important control is accurately computed, and the comparison result is identical.

Then, in Step S516, the engine control unit 118 executes the control of the engine unit 111 on the basis of the identical control volume of the engine important control.

Through the above operation of the control system, the control volume computation of the engine important control is also implemented by the meter control device 120 that is the second control device, and the control volumes are compared with each other. If a comparison result is different, the control volume computation is implemented by the AT control device 130 that is another second control device, and the control volumes are again compared with each other to specify the defective control device according to a comparison result. If the control device is not the control device of itself, the control of the engine unit 111 can be continued on the basis of the identical control volume.

As described above, in the control system according to the first embodiment of the present invention, it is determined that the control volume of the engine important control compared by the comparator unit 117 of the engine control device 110 is identical with the control volume of the engine important control, which is computed by the meter control device 120 that is the second control device. In this case, the engine unit 111 is controlled on the basis of the identical control volume of the important control. If it is determined that the control volume of the engine important control compared by the comparator unit 117 of the engine control device 110 is different, the control volume is again compared with the control volume of the engine important control, which is computed by the AT control device 130 that is another second control device. If a comparison result is identical, it is determined that the second control device is defective, and the engine unit 111 is controlled on the basis of the identical control volume of the important control. If the comparison result is different, it is determined that the control device of itself is defective, and the engine unit 111 is not controlled whereby the reliability of the control can be improved.

Also, in the control system according to the first embodiment of the present invention, the control device that computes the computation result of defect is specified with the use of the control volume of the engine important control that is implemented by the meter control device 120 or the AT control device 130 each having a different object to be controlled and a different control processing. Thus, since there is no provision of the CPU or the control device only for detecting the defect, the reliability of the engine important control can be ensured while suppressing unnecessary costs.

Furthermore, in the control system according to the first embodiment of the present invention, since the engine control device 110 is provided with the timer unit 119, the computation time of the second control device selected as the control volume computation implementation of the engine important control can be precisely grasped. The second control device is switched with a load that generates the computation implementation time according to the load as a result of which, the load is dispersed without continuously applying the load of the control volume computation of the engine important control on only one second control device, and the reliability of the engine important control can be ensured.

Also, in the control system according to the first embodiment of the present invention, with the provision of the selective second control device list 234 to the engine control device 110, the second control device can be intentionally selected. The second control device that is found in advance to be high in the load of the normal control is not optioned, or the number of selections is reduced. As a result, the reliability of the engine important control can be ensured while adjusting the load occurring in the second control device in advance.

As described above, according to the control system of the first embodiment of the present invention, in the first control device and the plurality of second control devices which are connected to the network, the first control device includes: the data transceiver unit that transmits and receives data through the network; the data collection unit that collects the control data necessary for computation of the control volume of, the important control on the object to be controlled by the first control device, and allows the collected control data to be stored in the first storage unit; the first storage unit that stores the first control volume computation procedure for computing the control volume of the important control, and the control data; the first control volume computation unit that computes the control volume of the important control on the basis of the first control volume computation procedure and the control data which are stored in the first storage unit; the comparison unit that compares the control volume of the important control computed by the first control volume computation unit with the control volume of the important control computed by the second control device; the control unit that controls the object to be controlled on the basis of the comparison result by the comparison unit; the computation implementation notification unit that notifies the pre-determined second control device of the computation implementation and computation stop of the control volume of the important control through the network; the time detection unit that detects the elapsed time; and the control device computation list that records the order of the second control devices that compute the control volume of the important control. The second control device includes: the data transceiver unit that transmits and receives data through the network; the control data saving unit that allows the control data received from the first control device through the network to be stored in the second storage unit; the second storage unit that stores the first control volume computation procedure, and the control data therein; the second control volume computation unit that computes the control volume of the important control on the basis of the stored first control volume computation procedure and control data; and the computation implementation determination unit that determines Computation implementation and computation stop of the control volume of the important according to the instruction of the computation destination instruction unit.

With this configuration, the control system that can ensure the reliability of the control can be obtained with no increase in the scale of the control system such that two microcomputers having the same function are disposed within the control device, or two other control devices for detecting the defect are provided, and the control volume related to the important control, which is computed by the first control device, is compared with the control volume related to the important control, which is computed by the second control device, and if the comparison result is identical, the control is implemented with that value whereas if the comparison result is different, the second control device is changed to another second control device, the comparison is implemented, and it is determined whether the object to be controlled is controlled or not, on the basis of the result.

Also, there can be obtained the control system that ensures the reliability of the control which suppresses unnecessary costs since there is no provision of the CPU or the control device only for detecting the defect.

Second Embodiment

Figure 7:
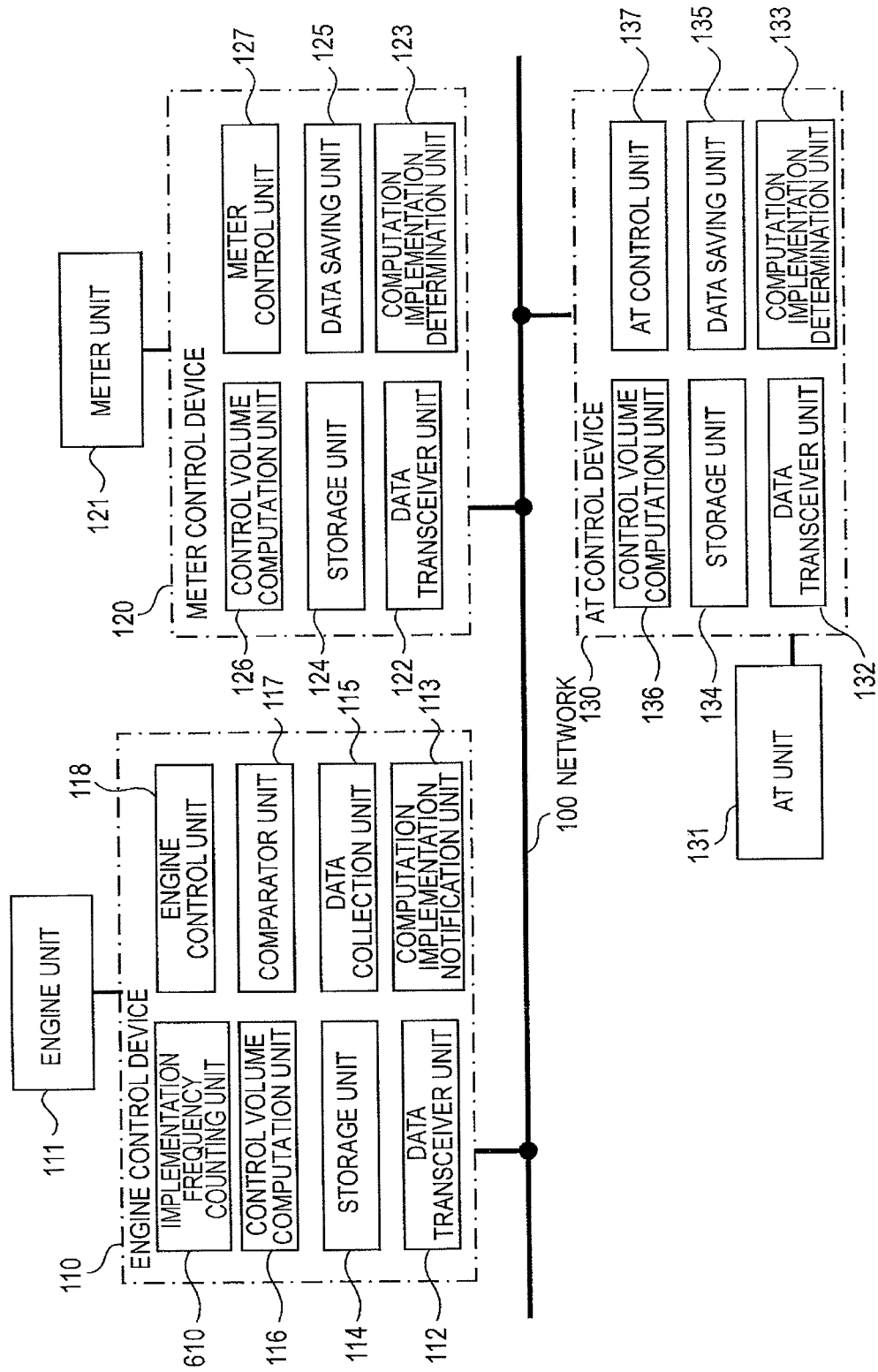
FIG. 7 is a block configuration diagram illustrating a control system according to a second embodiment of the present invention.

Subsequently, a control system according to a second embodiment of the present invention will be described. FIG. 7 is a block configuration diagram illustrating a control system according to the second embodiment of the present invention. In the node configuration of the network system in the control system illustrated in FIG. 7, parts indicated by the same symbols as those in the node configuration of the network system in the control system according to the first embodiment illustrated in FIG. 1 as described above have the respective identical functions, and their description will be omitted.

Referring to FIG. 7, the control system includes an engine control device 110 that is a first control device, a meter control device 120 that is one second control device, and an AT control device 130 that is another second control device, which are connected to each other through a network 100 as in the first embodiment. The respective control devices are connected to the engine unit 111, the meter unit 121, and the AT unit 131 which are objects to be controlled.

The engine control device 110 has an implementation frequency counting unit 610. The implementation frequency counting unit 610 counts a control volume computation implementation frequency of the engine important control of the selected second control device.

Figure 8:
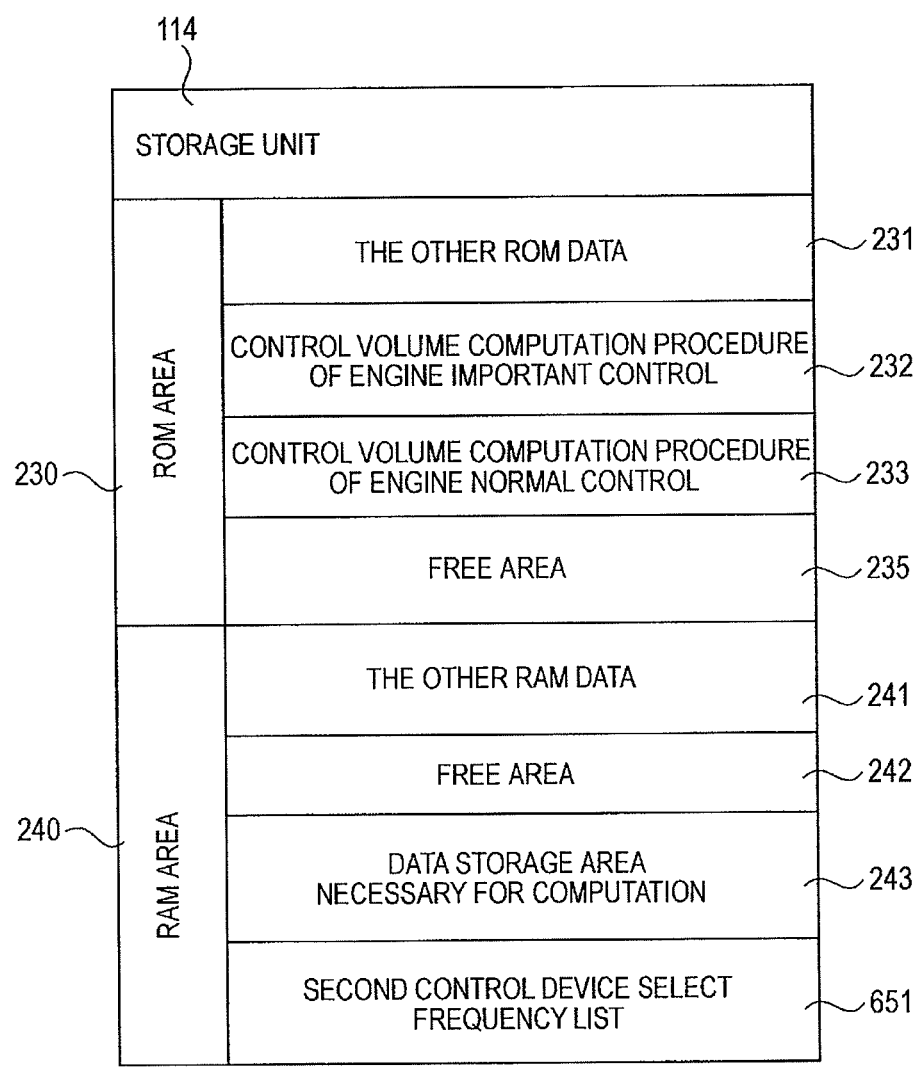
FIG. 8 is an illustrative diagram illustrating the detail of a storage unit of an engine control device in the control system according to the second embodiment of the present invention.

Subsequently, the storage unit 114 of the engine control device 110 will be described in detail. FIG. 8 is an illustrative diagram illustrating the detail of a storage unit of an engine control device in the control system according to the second embodiment of the present invention. The same symbols as those in FIG. 2 of the above first embodiment have identical functions, and therefore their description will be omitted. In the RAM area 240 is held a second control device select frequency list 651. The select frequency of the second control device that implements the control volume computation of the engine important control is saved in the second control device select frequency list 651, and updated every time the second control device is switched.

Subsequently, the operation of the engine control device 110 will be described. The engine control device 110 implements important processing related to the control volume computation of the engine important control, and normal processing other than the important processing. The important processing is repetitively executed if necessary. The normal processing is lower in priority than the important processing, and implemented in a time when the important processing is not implemented. Since the normal processing is directly irrelevant to the control system according to the second embodiment of the present invention, its description will be omitted.

Figure 9:
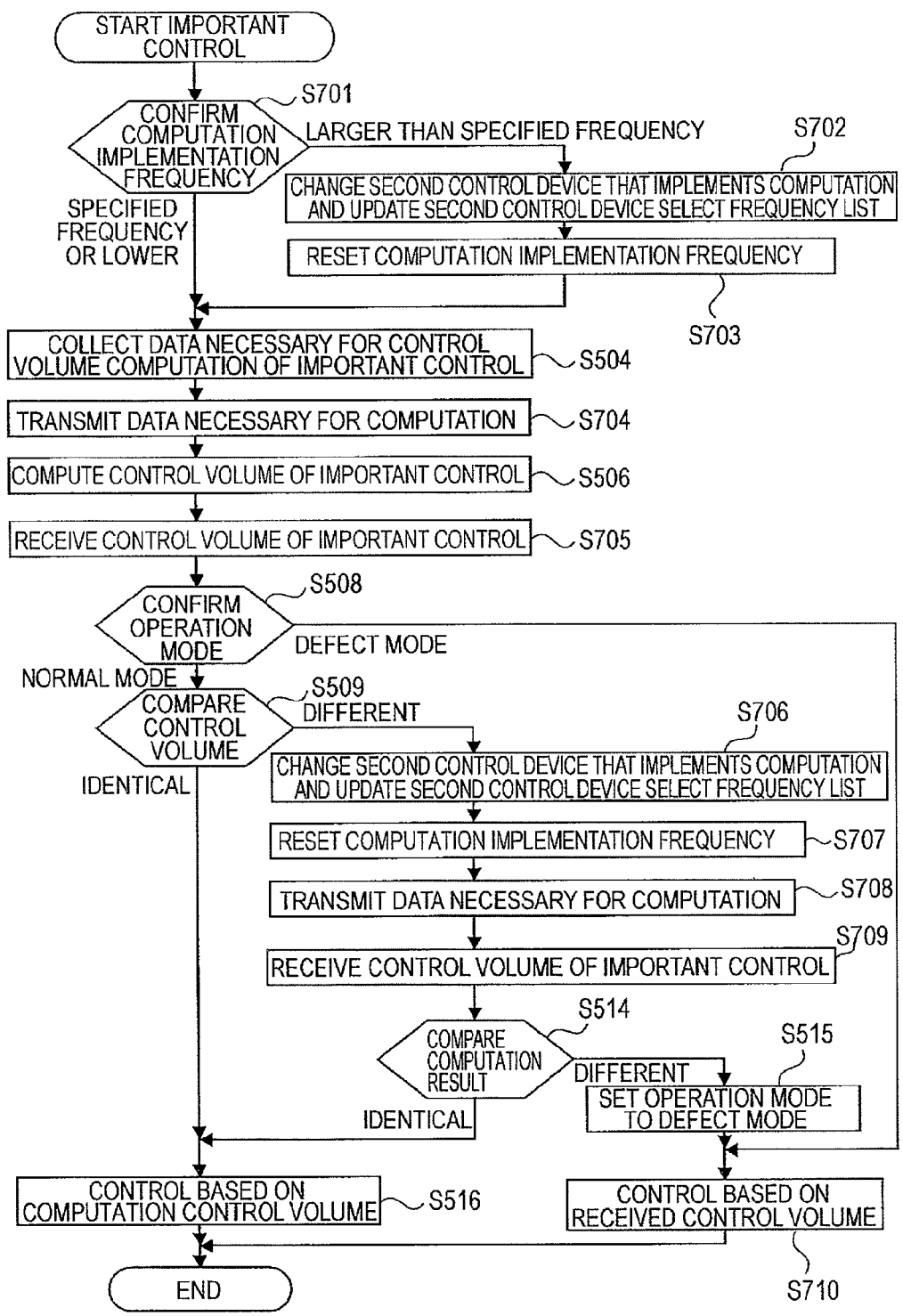
FIG. 9 is a flowchart illustrating the operation of the engine control device in the control system according to the second embodiment of the present invention.

Hereinafter, a flow of the important processing in the control system according to the second embodiment of the present invention will be described. FIG. 9 is a flowchart illustrating the operation of the engine control device in the control system according to the second embodiment of the present invention. The flowchart illustrated in FIG. 9 is implemented for each of the processing related to the engine important control that is the important processing. The parts represented by the same symbols as those in FIG. 6 of the first embodiment implement the identical processing.

In Step S701, the implementation frequency counting unit 610 confirms the computation implementation frequency of the second control device that implements the control volume computation of the engine important control, which is selected at that time. If the computation implementation frequency is a specified frequency or lower, the processing is advanced to Step S504, and if the computation implementation frequency is larger than the specified frequency, the processing is advanced to Step S702.

In Step S702, the computation implementation notification unit 113 in the engine control device 110 notifies the second control device that implements the control volume computation of the engine important control of the stop of the control volume computation of the engine important control, updates the second control device select frequency list 651 saved in the storage unit 114, and notifies the second control device to be selected next according to the second control device select frequency list 651 of the implementation of the control volume computation of the engine important control.

In Step S703, the implementation frequency counting unit 610 resets the control volume computation implementation frequency of the engine important control of the selected second control device to an initial value.

In Step S704, the data transceiver unit 112 transmits data necessary for the control volume computation of the engine important control to the selected second control device that implements the control volume computation of the engine important control.

In Step S705, the data transceiver unit 112 receives the control volume computation of the engine important control transmitted from the selected second control device that implements the control volume computation of the engine important control. In this example, the implementation frequency counting unit 610 increments the computation implementation frequency of the selected second control device by one.

Then, in Step S508, the comparator unit 117 confirms the operation mode of the engine control device 110 at the present time. If the operation mode is the normal mode, the processing is advanced to Step S509 whereas if the operation mode is the defect mode, the processing is advanced to Step S710. In this example, the normal mode indicates that no defect is detected up to now, and the defect mode indicates that the defect of the engine control device 110 per se is detected.

In Step S509, the comparator unit 117 compares the control volume of the engine important control computed in Step S506 with the control volume of the engine important control received in Step S507. If identical, the processing is advanced to Step S516, and if not identical, the processing is advanced to Step S706.

In Step S706, the computation implementation notification unit 113 notifies the second control device that has implemented the control volume computation of the engine important control up to now of stop of the control volume computation of the engine important control, updates the second control device select frequency list 651 saved in the storage unit 114, and notifies the second control device to be selected subsequently according to the second control device select frequency list 651 of the implementation of the control volume computation of the engine important control.

In Step S707, the implementation frequency counting unit 610 resets the control volume computation implementation frequency of the engine important control of the selected second control device to an initial value.

In Step S708, the data transceiver unit 112 transmits data necessary for the control volume computation of the engine important control to the selected second control device that implements the control volume computation of the engine important control.

In Step S709, the data transceiver unit 112 receives the control volume of the engine important control transmitted from the selected second control device that implements the control volume computation of the engine important control. In this example, the implementation frequency counting unit 610 increments the computation implementation frequency of the selected second control device by one.

On the other hand, if the processing is advanced from Step S508 or S515 to Step S710, in Step S710, the engine control unit 118 executes the control of the engine unit 111 on the basis of the control volume of the engine important control transmitted from the selected second control device that implements the control volume computation of the engine important control.

The operation of the meter control device 120 and the operation of the AT control device 130 are identical with those in the first embodiment, and therefore their description will be omitted.

Subsequently, referring to a flowchart of FIG. 9, a description will be given of the operation of the control system when the control volume computation unit 116 of the engine control device 110, the control volume computation unit 126 of the meter control device 120, and the control volume computation unit 136 of the AT control device 130 are not defective, and the control volume related to the engine important control is accurately computed. First, it is assumed that the meter control device 120 is designated as the second control device that implements the control volume computation of the engine important control. Also, it is assumed that the operation mode of the engine control device 110 is the normal mode indicating that no defect is detected up to now.

First, when the important processing related to the control volume computation of the engine important control starts, the implementation frequency counting unit 610 of the engine control device 110 confirms the computation implementation frequency of the selected meter control device 120 in Step S701. In this example, it is assumed that the computation implementation frequency is a specified value or lower.

Then, in Step S504, the data collection unit 115 collects data necessary for the control volume computation of the engine important control, and stores the collected data in the data storage area 243 necessary for computation of the storage unit 114.

Then, in Step S704, the data transceiver unit 112 transmits data necessary for the control volume computation of the engine important control to the meter control device 120. On the other hand, since the meter control device 120 receives data necessary for the control volume computation of the engine important control from the engine control device 110, the meter control device 120 stores the received data in the data storage area 343 necessary for computation of the storage unit 124.

Then, in Step S506, the control volume computation unit 116 computes the control volume of the engine important control on the basis of data necessary for the control volume computation of the engine important control, which is stored in the storage unit 114, and the control volume computation procedure 232 of the engine important control. On the other hand, in the meter control device 120, the control volume computation unit 126 computes the control volume of the engine important control on the basis of data necessary for the control volume computation of the engine important control, which is stored in the storage unit 124, and the control volume computation procedure 232 of the engine important control. Then, the data transceiver unit 122 transmits the control volume of the engine important control to the engine control device 110.

Subsequently, in Step S705, the data transceiver unit 112 receives the control volume of the engine important control transmitted from the meter control device 120. In this example, the implementation frequency counting unit 610 increments the computation implementation time frequency of the meter control device 120 by one.

Then, in Step S508, the comparator unit 117 confirms the operation mode of the engine control device 110. In this example, the operation mode is the normal mode.

Subsequently, in Step S509, the comparator, unit 117 compares the control volume of the engine important control computed by the comparator unit 117 by itself with the control volume of the engine important control received from the meter control device 120. In this example, the comparison result is identical.

Then, in Step S516, the engine control unit 118 executes the control of the engine unit 111 on the basis of the identical control volume of the engine important control.

Through the above operation of the control system, the control volume computation of the engine important control is also implemented by the meter control device 120 selected as the second control device, and the control volumes are compared with each other. If a comparison result is identical, the control of the engine unit 111 can be continued on the basis of the identical control volume.

Subsequently, like the above description, referring to the flowchart of FIG. 9, a description will be given of the operation of the control system when the control volume computation unit 116 of the engine control device 110, the control volume computation unit 126 of the meter control device 120, and the control volume computation unit 136 of the AT control device 130 are not defective, and the control volume related to the engine important control is accurately computed in which the computation implementation time of the meter control device 120 that implements the control volume computation of the engine important control exceeds the specified frequency. In this example, in the second control device select frequency list 651 are recorded the select frequency 2 of the meter control device 120 and the select frequency 2 of the AT control device 130.

First, when the important processing related to the control volume computation of the engine important control starts, the implementation frequency counting unit 610 of the engine control device 110 confirms the computation implementation frequency of the selected meter control device 120 in Step S701. In this example, it is assumed that the computation implementation frequency is over a specified value.

Then, in Step S702, the computation implementation notification unit 113 in the engine control device 110 notifies the meter control device 120 of the stop of the control volume computation of the engine important control, and updates the select frequency of the meter control device 120 in the second control device select frequency list 651 saved in the storage unit 114 from 2 to 3. Then, the computation implementation notification unit 113 selects the AT control device 130 the select frequency of which is two, that is, smallest, according to the second control device select frequency list 651, and notifies the AT control device 130 of the implementation of the control volume computation of the engine important control. In this example, the computation implementation determination unit 123 of the meter control device 120 receives a notice to stop the control volume computation of the engine important control from the computation implementation notification unit 113 of the engine control device 110, and therefore determines that the meter control device 120 is not designated as the second control device that implements the control volume computation of the engine important control. Also, the computation implementation determination unit 133 of the AT control device 130 receives a notice to implement the control volume computation of the engine important control from the computation implementation notification unit 113 of the engine control device 110. Therefore, it is determined that the AT control device 130 is designated as the second control device that implements the control volume computation of the engine important control.

Then, in Step S703, the implementation frequency counting unit 610 resets the computation implementation frequency of the AT control device 130 to an initial value.

Subsequently, in Step S504, the data collection unit 115 collects data necessary for the control volume computation of the engine important control, and stores the collected data in the data storage area 243 necessary for computation of the storage unit 114.

Then, in Step S704, the data transceiver unit 112 transmits data necessary for the control volume computation of the engine important control to the AT control device 130. On the other hand, the AT control device 130 receives data necessary for the control volume computation of the engine important control from the engine control device 110, and therefore stores the received data in the data storage area 443 necessary for computation of the storage unit 134.

Subsequently, in Step S506, the control volume computation unit 116 computes the control volume of the engine important control on the basis of data necessary for the control volume computation of the engine important control, which is stored in the storage unit 114, and the control volume computation procedure 232 of the engine important control. On the other hand, the AT control device 130 computes the control volume of the engine important control on the basis of data necessary for the control volume computation of the engine important control, which is stored in the storage unit 144, and the control volume computation procedure 232 of the engine important control. Then, the AT control device 130 transmits the control volume of the engine important control to the engine control device 110 through a data transceiver unit 142.

Then, in Step S705, the data transceiver unit 112 receives the control volume of the engine important control transmitted from the AT control device 130. In this example, the implementation frequency counting unit 610 increments the computation implementation time frequency of the AT control device 130 by one.

Subsequently, the processing is advanced to Steps S508, S509, and S516. However, those processing is the same processing contents as those described above, and therefore their description will be omitted.

Through the above operation of the control system, the control volume computation of the engine important control is also implemented by the meter control device 120 selected as the second control device. If the control volume computation exceeds a specified computation frequency, the meter control device 120 is switched to the AT control device 130 that is the second control device the select frequency of which, is smallest according to the second control device select frequency list 651, and computation is conducted. If a comparison result of the control volume is identical, the control of the engine unit 111 can be continued on the basis of the identical control volume.

Then, the operation of the control system when the control volume computation unit 116 of the engine control device 110 is defective, and the control volume of the engine important control is not accurately computed will be described with reference to the flowchart of FIG. 9. First, it is assumed that the meter control device 120 is designated as the second control device that implements the control volume computation of the engine important control. Also, it is assumed that the operation mode of the engine control device 110 is the normal mode indicating that no defect is detected up to now. In this example, in The second control device select frequency list 651 are recorded the select frequency 2 of the meter control device 120 and the select frequency 2 of the AT control device 130.

The processing of The engine control device 110 is advanced to Steps S701, S504, S704, S506, S705, and S508. Those processing is identical with that in the above-mentioned case where there is no defect, and therefore their description will be omitted.

Subsequently, in Step S509, the comparator unit 117 compares the control volume of the engine important control computed by the comparator unit 117 with the control volume of the engine important control received from the meter control device 120. In this example, the control volume computation unit 116 is defective, and the control volume of the engine important control is not accurately computed, and therefore the comparison result is different.

Subsequently, in Step S706, the computation implementation notification unit 113 in the engine control device 110 notifies the meter control device 120 of the stop of the control volume computation of the engine important control, and updates the select frequency of the meter control device 120 in the second control device select frequency list 651 saved in the storage unit 114 from 2 to 3. Then, the computation implementation notification unit 113 selects the AT control device 130 the select frequency of which is two, that is, smallest, according to the second control device select frequency list 651, and notifies the AT control device 130 of the control volume computation of the engine important control. In this example, the computation implementation determination unit 123 of the meter control device 120 receives a notice to stop the control volume computation of the engine important control from the computation implementation notification unit 113 of the engine control device 110, and therefore determines that the meter control device 120 is not designated as the second control device that implements the control volume computation of the engine important control. Also, the computation implementation determination unit 133 of the AT control device 130 receives a notice to implement the control volume computation of the engine important control from the computation implementation notification unit 113 of the engine control device 110. Therefore, it is determined that the AT control device 130 is designated as the second control device that implements the control volume computation of the engine important control.

Subsequently, in Step S707, the implementation frequency counting unit 610 resets the computation implementation frequency of the AT control device 130 to an initial value.

Then, in Step S708, the data transceiver unit 112 transmits data necessary for the control volume computation of the engine important control to the AT control device 130. On the other hand, in the AT control device 130, the data transceiver unit 132 receives data necessary for the control volume computation of the engine important control from the engine control device 110, and therefore stores the received data in the data storage area 443 necessary for computation of the storage unit 134. Then, the AT control device 130 computes the control volume of the engine important control on the basis of data necessary for the control volume computation of the engine important control, which is stored in the storage unit 134, and the control volume computation procedure 232 of the engine important control. Then, the data transceiver unit 132 transmits the control volume of the engine important control to the engine control device 110.

Then, in Step S709, the data transceiver unit 112 receives the control volume of the engine important control transmitted from the AT control device 130. In this example, the implementation frequency counting unit 610 increments the computation implementation time frequency of the AT control device 130 by one.

Then, in Step S514, the comparator unit 117 compares the control volume of the engine important control computed by the comparator unit 117 with the control volume of the engine important control received from the AT control device 130. In this example, because the control volume computation unit 116 is defective, and the control volume of the engine important control is not accurately computed, the comparison result is again different.

Subsequently, in Step S515, the comparator unit 117 determines that the control device of itself is defective because the comparison result is again different, and sets the operation mode of the engine control device 110 to the defect mode.

Then, in Step S710, the engine control unit 118 executes the control of the engine unit 111 on the basis of the control volume of the engine important control transmitted from the selected AT control device 130 that implements the control volume computation of the engine important control.

Through the above operation of the control system, the control volume computation of the engine important control is also implemented by the meter control device 120 selected as the second control device, and the control volumes are compared with each other. If a comparison result is different, the control volume computation is implemented by the AT control device 130 that is another second control device, and the control volumes are again compared with each other to specify the defective control device. If the control device is the control device of itself, the control of the engine unit 111 can be executed on the basis of the control volume received from the second control device.

Subsequently, referring to a flowchart of FIG. 9, a description will be given of the operation of the control system when the control volume computation unit 126 of the meter control device 120 is defective, and the control volume of the engine important control is not accurately computed. First, it is assumed that the meter control device 120 is designated as the second control device that implements the control volume computation of the engine important control. Also, it is assumed that the operation mode of the engine control device 110 is the normal mode indicating that no defect is detected up to now. In this example, in the second control device select frequency list 651 are recorded the select frequency 2 of the meter control device 120 and the select frequency 2 of the AT control device 130.

The processing of the engine control device 110 is advanced to Steps S701, S504, S704, S506, S705, S508, S509, S706, S707, S708, and S709. In this case, in Step S706, the AT control device 130 is selected as the second control device. Those processing is identical with that in the above-mentioned case where the control volume computation unit 116 of the engine control device 110 is defective, and therefore their description will be omitted.

Subsequently, in Step S514, the comparator unit 117 of the engine control device 110 compares the control volume of the engine important control computed by the comparator unit 117 with the control volume of the engine important control received from the AT control device 130. In this example, since the control volume computation unit 116 of the engine control device 110 and the control volume computation unit 136 of the meter control device 120 are not defective, the control volume of the engine important control is accurately computed, and the comparison result is identical.

Subsequently, in Step S516, the engine control unit 110 executes the control of the engine unit 111 on the basis of the identical control volume of the engine important control.

Through the above operation of the control system, the control volume computation of the engine important control is also implemented by the meter control device 120 selected as the second control device, and the control volumes are compared with each other. If a comparison result is different, the control volume computation is implemented by the AT control device 130 that is another second control device, and the control volumes are again compared with each other to specify the defective control device according to the comparison result. If the control device is not the control device of itself, the control of the engine unit 111 can be continued on the basis of the identical control volume.

As described above, in the control system according to the second embodiment of the present invention, it is determined that the control volume of the engine important control compared by the comparator unit 117 of the engine control device 110 is identical with the control volume of the engine important control, which is computed by the meter control device 120 that is the second control device. In this case, the engine unit 111 is controlled on the basis of the identical control volume of the important control. If it is determined that the control volume of the engine important control compared by the comparator unit 117 is different, the control volume is again compared with the control volume of the engine important control, which is computed by the AT control device 130 that is another second control device. If a comparison result is identical, it is determined that the second control device compared previously is defective, and the engine unit 111 is controlled on the basis of the identical control volume of the important control. If the comparison result is different, it is determined that the control device of itself is defective, and the engine unit 111 is controlled on the basis of the control volume of the engine important control received from the second control device whereby the reliability of the control can be improved.

Also, in the control system according to the second embodiment of the present invention, the control device that computes the computation result of defect is specified with the use of the control volume of the engine important control that is implemented by the meter control device 120 or the AT control device 130 each having a different object to be controlled and a different control processing. Thus, since there is no provision of the CPU or the control device only for detecting the defect, the reliability of the engine important control can be ensured while suppressing unnecessary costs.

Furthermore, in the control system according to the second embodiment of the present invention, since the engine control device 110 is provided with the implementation frequency counting unit 610, the computation frequency of the second control device selected as the control volume computation implementation of the engine important control can be precisely grasped. The second control device is switched with a load that generates the computation implementation frequency according to the load as a result of which, the load is dispersed without continuously applying the load of the control volume computation of the engine important control on only one second control device, and the reliability of the engine important control can be ensured.

Also, in the control system according to the second embodiment of the present invention, with the provision of the second control device select frequency list 651 to the engine control device 110, the load of the control volume computation of the engine important control is not exerted on only the specific second control device, but the load can be distributed while switching the second control device according to the select frequency, and the reliability of the engine important control can be ensured while uniforming the load exerted on the second control device as the control system.

As described above, according to the control system of the second embodiment of the present invention, in the first control device and the plurality of second control devices which are connected to the network, the first control device includes: the data transceiver unit that transmits and receives data through the network; the data collection unit that collects the control data necessary for computation of the control volume of the important control on the object to be controlled by the first control device, and allows the collected control data to be stored in the first storage unit; the first storage unit that stores the first control volume computation procedure for computing the control volume of the important control, and the control data; the first control volume computation unit that computes the control volume of the important control on the basis of the first control volume computation procedure and the control data which are stored in the first storage unit; the comparison unit that compares the control volume of the important control computed by the first control volume computation unit with the control volume of the important control computed by the second control device; the control unit that controls the object to be controlled on the basis of the comparison result by the comparison unit; the computation implementation notification unit that notifies the pre-determined second control device of the computation implementation and computation stop of the control volume of the important control through the network; the implementation frequency counting unit that counts the control volume computation implementation frequency of the engine important control of the selected second control device; and the second control device select frequency list that saves the select frequency of the second control device that computes the control volume of the important control. The second control device includes: the data transceiver unit that transmits and receives data through the network; the control data saving unit that allows the control data received from the first control device through the network to be stored in the second storage unit; the second storage unit that stores the first control volume computation procedure, and the control data therein; the second control volume computation unit that computes the control volume of the important control on the basis of the stored first control volume computation procedure and control data; and the computation implementation determination unit that determines computation implementation and computation stop of the control volume of the important control according to the instruction of the computation destination instruction unit.

With this configuration, the control system that can ensure the reliability of the control can be obtained with no increase in the scale of the control system such that two microcomputers having the same function are disposed within the control device, or two other control devices for detecting the defect are provided, and the control volume related to the important control, which is computed by the first control device, is compared with the control volume related to the important control, which is computed by the second control device, and if the comparison result is identical, the control is implemented with that value whereas if the comparison result is different, the second control device is changed to another second control device, the comparison is implemented, and it is determined whether the object to be controlled is controlled or not, on the basis of the result.

Also, there can be obtained the control system that ensures the reliability of the control which suppresses unnecessary costs since there is no provision of the CPU or the control device only for detecting the defect.

Third Embodiment

Figure 10:
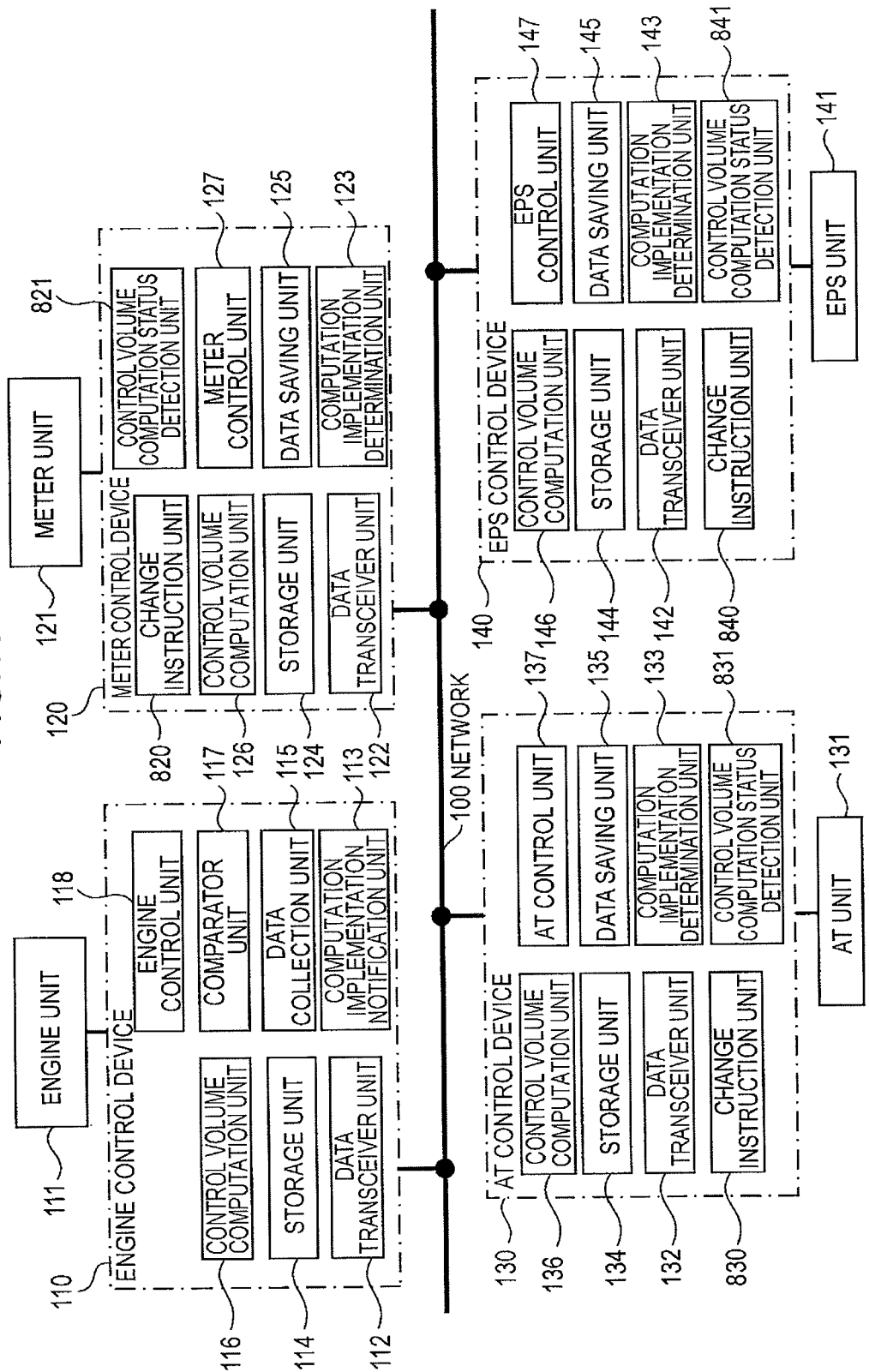
FIG. 10 is a block configuration diagram illustrating a control system according to a third embodiment of the present invention.

Subsequently, a control system according to a third embodiment of the present invention will be described. FIG. 10 is a block configuration diagram illustrating a control system according to the embodiment of the present invention. In the node configuration of the network system in the control system illustrated in FIG. 10, parts indicated by the same symbols as those in the node configuration of the network system in the control system according to the first embodiment illustrated in FIG. 1 as described above have the respective identical functions, and their description will be omitted.

Referring to FIG. 10, the control system includes an engine control device 110 that is a first control device, a meter control device 120 and an AT control device 130 as second control devices, which are connected to each other through a network 100 as in the first embodiment. Further, an electric power steering (EPS) control device 140 is connected as the second control device. The respective control devices are connected to the engine unit 111, the meter unit 121, the AT unit 131, and the EPS unit 141, which are objects to be controlled.

Figure 11:
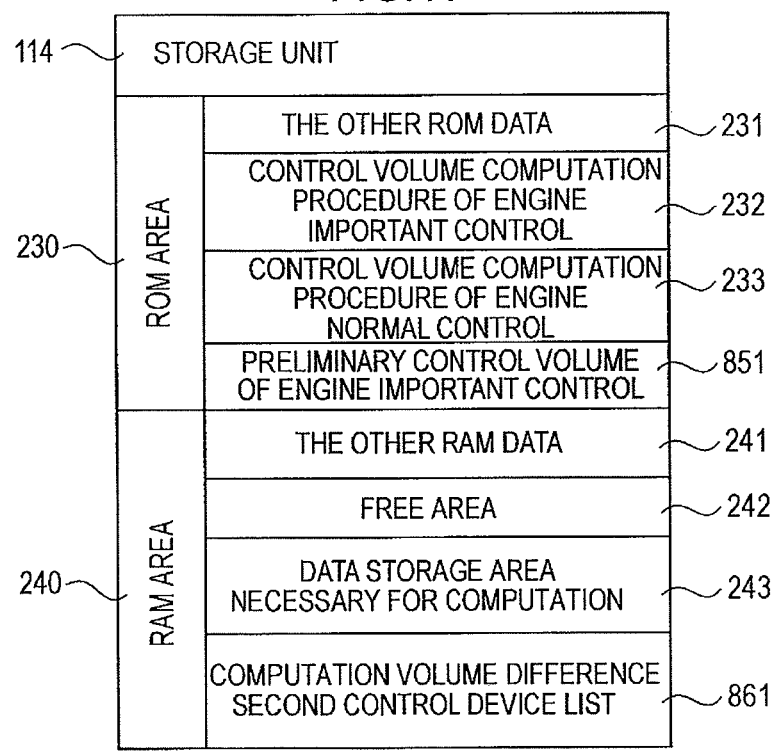
FIG. 11 is an illustrative diagram illustrating the detail of a storage unit of an engine control device in the control system according to the third embodiment of the present invention.

Subsequently, the storage unit 114 of the engine control device 110 will be described in detail. FIG. 11 is an illustrative diagram illustrating the detail of a storage unit of an engine control device in the control system according to the third embodiment of the present invention. The same symbols as those in FIG. 2 of the above first embodiment have identical functions, and therefore their description will be omitted. In the ROM area 230 is held a preliminary control volume 851 of the engine important control. The preliminary control volume 851 of the engine important control is a control volume of the important control of the engine for operating the engine used for emergency not under the original control but in a safe range. In the RAM area 240 is held an computation volume difference second control device 861. In the computation volume difference second control device list 861 is saved the second control device where a result comparing the control volume computation of the engine important control is different.

Subsequently, returning to FIG. 10, the configuration and function of the meter control device 120, the AT control device 130, and an EPS control device 140 will be described. The meter control device 120 includes a change instruction unit 820 and a control volume computation status detection unit 821. The change instruction unit 820 instructs the engine control device 110 to select another second control device according to a determination based on a processing load on the control volume computation status detection unit 821 that detects the load.

Further, the AT control device 130 includes a change instruction unit 830 and a control volume computation status detection unit 831. The change instruction unit 830 instructs the engine control device 110 to select another second control device according to a determination based on a processing load on the control volume computation status detection unit 831 that detects the load.

The EPS control device 140 includes the data transceiver unit 142, an computation implementation determination unit 143, the storage unit 144 as a second storage unit, a data saving unit 145, a control volume computation unit 146 as a second control volume computation unit, an EPS control unit 14T, a change instruction unit 840, and a control volume computation status detection unit 841. Also, the control volume computation unit 146 is configured by a microcomputer. Also, the EPS control device 140 has necessary components other than the above respective units, but since the necessary components are directly irrelevant to the control system according to the third embodiment, their description will be omitted.

The data transceiver unit 142 transmits and receives data with respect to other control devices including the engine control device 110, the meter control device 120, and the AT control device 130, which are connected to the network 100 through the network 100. The computation implementation determination unit 143 determines the implementation and stop of the control volume computation of the engine important control according to the notice from the engine control device 110 through the network 100. The storage unit 144 records various data, which will be described later, therein.

The data saving unit 145 saves data necessary for the control volume computation of the engine important control, which is received from the engine control device 110, therein. The control volume computation unit 146 computes the control volume necessary for the EPS control and the engine control on the basis processing procedure which will be described later. The EPS control unit 147 executes the control of the EPS unit 141 on the basis of the computed control volume. The change instruction unit 840 instructs the engine control device 110 to select another second control device according to a determination from a processing load exerted on the control volume computation status detection unit 841 that detects the load.

Figure 12:
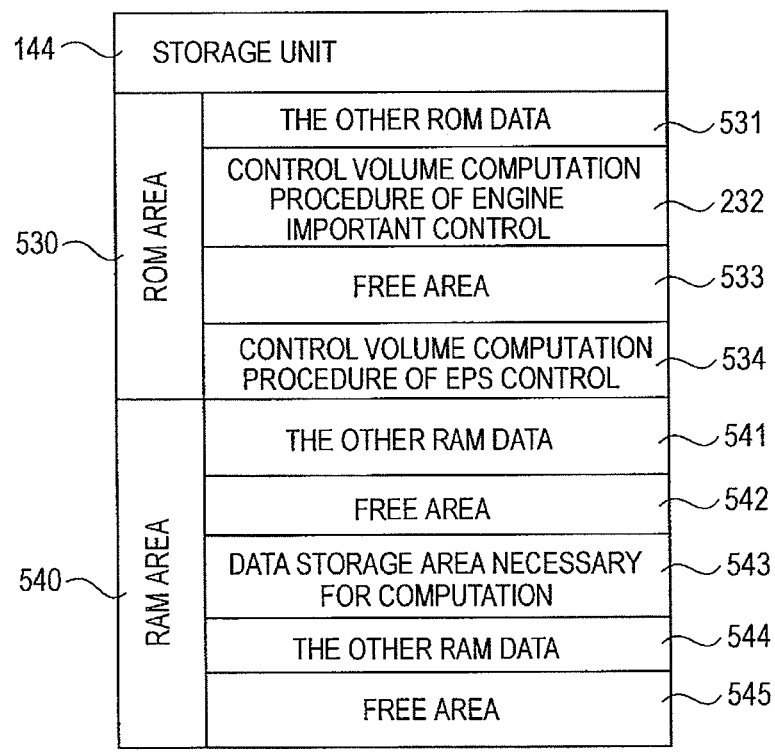
FIG. 12 is an illustrative diagram illustrating the detail of a storage unit of an EPS control device in the control system according to the third embodiment of the present invention.

Then, the storage unit 144 of the EPS control device 140 will be described in detail. FIG. 12 is an illustrative diagram illustrating the detail of the storage unit of the EPS control device in the control system according to the third embodiment of the present invention. Referring to FIG. 12, the storage unit 144 is classified into a ROM area 530 that cannot store data other than data stored in advance, and a RAM area 540 that enables storage of data.

The ROM area 530 includes the other ROM data 531, a control volume computation procedure 232 of the engine importance control, a free area 533, and a control volume computation procedure 534 of the EPS control. In the following description, the other ROM data 531 and the free area 533 are directly irrelevant to the control system according to the third embodiment, and therefore their description will be omitted.

The control volume computation procedure 232 of the engine important control in the storage unit 144 is indicative of a control volume computation procedure of the engine important control, and stores the same contents as those in the storage unit 114, the storage unit 124, and the storage unit 134. The control volume computation procedure 534 of the EPS control is indicative of an computation procedure of the control volume related to the control of the EPS.

Also, the RAM area 540 includes the other RAM data 541, a free area 542, a data storage area 543 necessary for computation, the other RAM data 544, and a free area 545. In this example, the other RAM data 541, the free area 542, the other RAM data 544, and the free area 545 are directly irrelevant to the control system according to the third embodiment, and therefore their description will be omitted. The data storage area 543 necessary for computation stores data necessary for the control volume computation of the engine important control therein.

In FIG. 10, the change instruction unit 820, the change instruction unit 830, and the change instruction unit 840 may be each configured by the same component. Also, the control volume computation status detection unit 821, the control volume computation status detection unit 831, and the control volume computation status detection unit 841 may be each configured by the same component.

Subsequently, the operation of the engine control device 110 will be described. The engine control device 110 implements important processing related to the control volume computation of the engine important control, and normal processing other than the important processing. The important processing is repetitively executed if necessary. The normal processing is lower in priority than the important processing, and implemented in a time when the important processing is not implemented. Since the normal processing is directly irrelevant to the control system according to the third embodiment, its description will be omitted.

Figure 13:
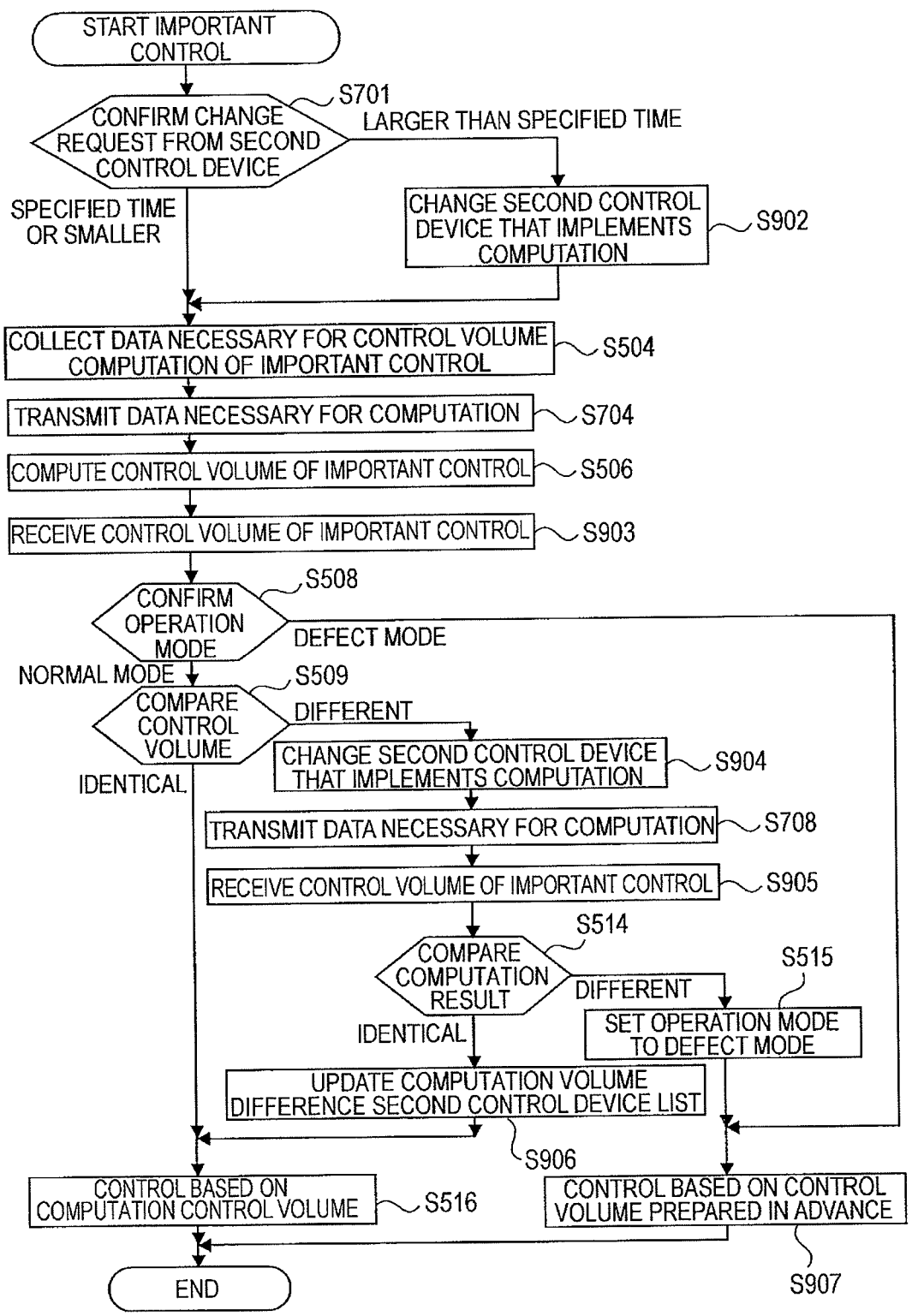
FIG. 13 is a flowchart illustrating the operation of the engine control device in the control system according to the third embodiment of the present invention.
Figure 14:
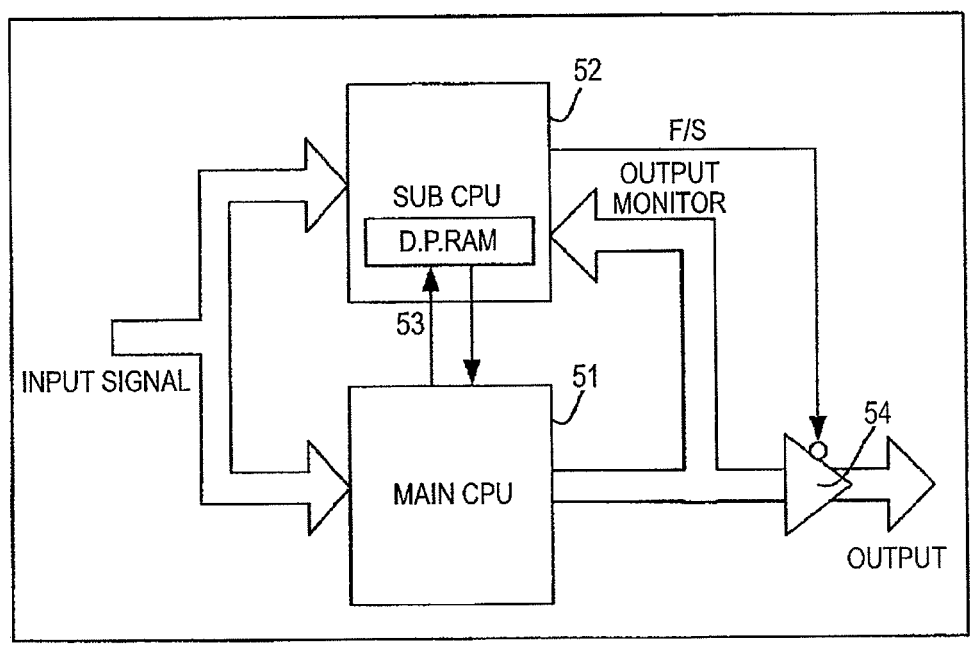
FIG. 14 is a block configuration diagram of one related-art control system.
Figure 15:
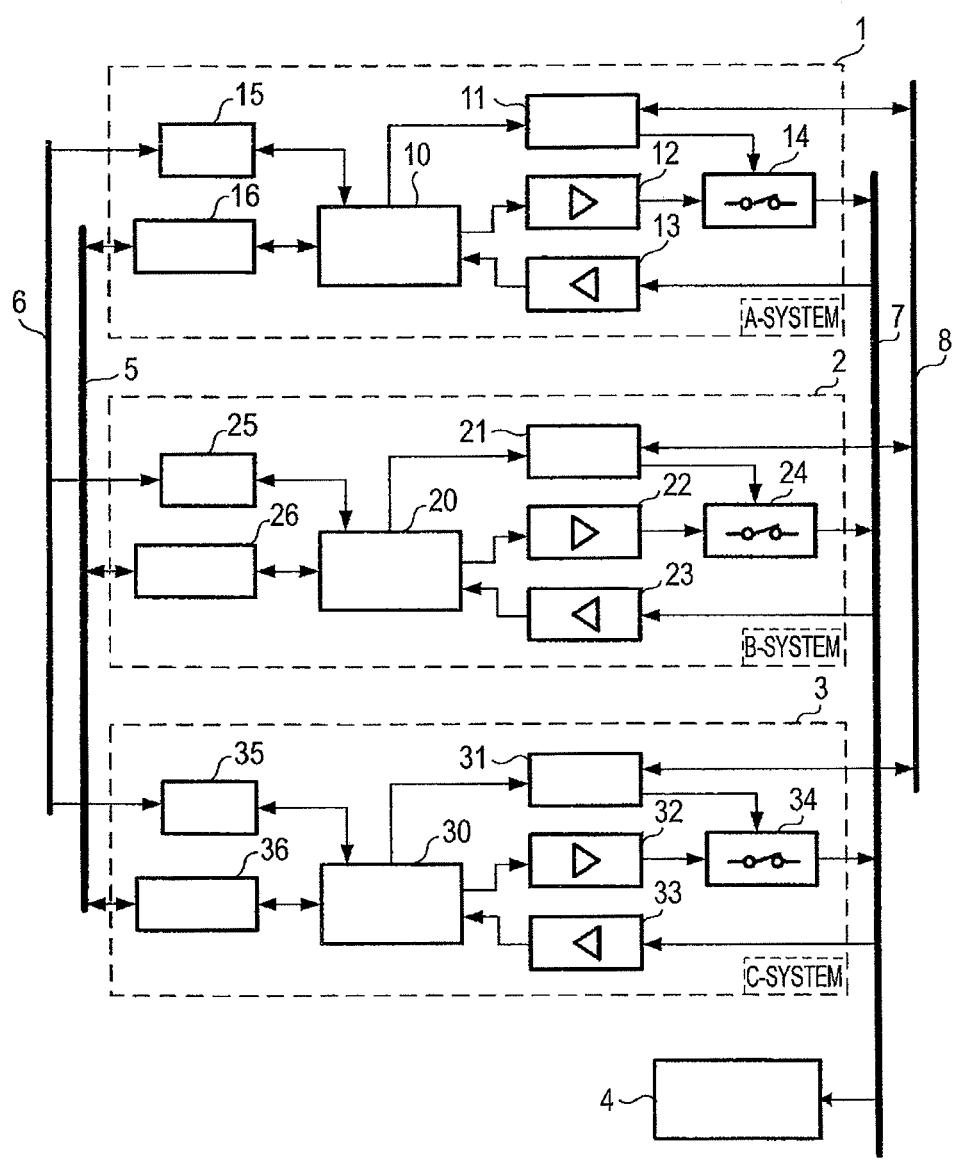
FIG. 15 is a block configuration diagram of another related-art control system.

Hereinafter, a flow of the important processing in the control system according to the third embodiment of the present invention will be described. FIG. 13 is a flowchart illustrating the operation of the engine control device in the control system according to the third embodiment of the present invention. The flowchart illustrated in FIG. 13 is implemented for each of the processing related to the engine important control which is important processing. The parts denoted by the same symbols as those in FIG. 6 in the first embodiment and in FIG. 9 in the second embodiment implement the same processing, and therefore their description will be omitted.

Referring to FIG. 13, in Step S901, the computation implementation notification unit 113 confirms whether the change instruction has been received from the second control device that implements the control volume computation of the engine important control, which has been selected at that time, or not. If received, the processing is advanced to Step S902, and if not received, the processing is advanced to Step S504.

In Step S902, the computation implementation notification unit 113 notifies the second control device that has implemented the control volume computation of the engine important control till that time of the stop of the control volume computation of the engine important control, and notifies the second control device to be selected next according to the computation volume difference second control device list 861 of the implementation of the control volume computation of the engine important control.

In Step S903, the data transceiver unit 112 receives the control volume of the engine important control transmitted from the selected second control device that implements the control volume computation of the engine important control.

In Step S904, the computation implementation notification unit 113 notifies the second control device that has implemented the control volume computation of the engine important control till that time of the stop of the control volume computation of the engine important control, and notifies the second control device to be selected next according to the computation volume difference second control device list 861 of the implementation of the control volume computation of the engine important control.

In Step S905, the data transceiver unit 112 receives the control volume of the engine important control transmitted from the selected second control device that implements the control volume computation of the engine important control.

In Step S906, the comparator unit 117 adds the previously selected second control device different in the comparison result to the computation volume difference second control device list 861.

In Step S907, the engine control unit 118 executes the control of the engine unit 111 on the basis of the preliminary control volume 851 of the engine important control prepared in advance.

Subsequently, the operation of the meter control device 120 will be described. The meter control device 120 implements the normal processing necessary for controlling the meter unit 121 on the basis of the control volume computation procedure 333 of the normal meter control stored in the storage unit 124. However, when the meter control device 120 is designated as the second control device that implements the control volume computation of the engine important control, if the data transceiver unit 122 receives data necessary for the control volume computation of the engine important control from the engine control device 110, the data transceiver unit 122 stores the received data in the data storage area 343 necessary for computation of the storage unit 124. Then, the meter control device 120 computes the control volume of the engine important control on the basis of data necessary for the control volume computation of the engine important control, which is stored in the storage unit 124, and the control volume computation procedure 232 of the engine important control. The meter control device 120 transmits the control volume of the engine important control to the engine control device 110 through the data transceiver unit 122. Those processing related to the control volume of the engine important control is implemented with highest priority. If the control volume computation status detection unit 821 detects that the processing load is increased by the implementation of the processing related to the control volume of the engine important control, the change instruction unit 820 instructs the engine control device 110 to select another second control device.

If receiving the notice to implement the control volume computation of the important control from the computation implementation notification unit 113 of the engine control device 110, the computation implementation determination unit 123 of the meter control device 120 determines that the meter control device 120 is designated as the second control device that implements the control volume computation of the engine important control. If receiving the stop notice, the computation implementation determination unit 123 determines that the meter control device 120 is not designated as the second control device.

Subsequently, the operation of the AT control device 130 will be described. The AT control device 130 implements the normal processing necessary for controlling the AT unit 131 on the basis of the control volume computation procedure 433 of the normal AT control stored in the storage unit 134. However, when the AT control device 130 is designated as the second control device that implements the control volume computation of the important control, if the data transceiver unit 132 receives data necessary for the control volume computation of the engine important control from the engine control device 110, the data transceiver unit 132 stores the received data in the data storage area 443 necessary for computation of the storage unit 134. Then, the AT control device 130 computes the control volume related to the engine important control on the basis of data necessary for the control volume computation of the engine important control, which is stored in the storage unit 134, and the control volume computation procedure 232 of the engine important control. The AT control device 130 transmits the control volume of the engine important control to the engine control device 110 through the data transceiver unit 132. Those processing related to the control volume of the engine important control is implemented with highest priority. If the control volume computation status detection unit 831 detects that the processing load is increased by the implementation of the processing related to the control volume of the engine important control, the change instruction unit 830 instructs the engine control device 110 to select another second control device.

If receiving the notice to implement the control volume computation of the important control from the computation implementation notification unit 113 of the engine control device 110, the computation implementation determination unit 133 of the AT control device 130 determines that the AT control device 130 is designated as the second control device that implements the control volume computation of the engine important control. If receiving the stop notice, the computation implementation determination unit 133 determines that the AT control device 130 is not designated as the second control device.

Subsequently, the operation of the EPS control device 140 will be described. The EPS control device 140 implements the normal processing necessary for controlling the EPS unit 141 on the basis of the control volume computation procedure 534 of the normal EPS control stored in the storage unit 144. However, when the EPS control device 140 is designated as the second control device that implements the control volume computation of the important control, if the data transceiver unit 142 receives data necessary for the control volume computation of the engine important control from the engine control device 110, the data transceiver unit 142 stores the received data in the data storage area 543 necessary for computation of the storage unit 144. Then, the EPS control device 140 computes the control volume related to the engine important control on the basis of data necessary for the control volume computation of the engine important control, which is stored in the storage unit 144, and the control volume computation procedure 232 of the engine important control. The EPS control device 140 transmits the control volume of the engine important control to the engine control device 110 through the data transceiver unit 142. Those processing related to the control volume of the engine important control is implemented with highest priority. If the control volume computation status detection unit 841 detects that the processing load is increased by the implementation of the processing related to the control volume of the engine important control, the change instruction unit 840 instructs the engine control device 110 to select another second control device.

If receiving the notice to implement the control volume computation of the important control from the computation implementation notification unit 113 of the engine control device 110, the computation implementation determination unit 143 of the EPS control device 140 determines that the EPS control device 140 is designated as the second control device that implements the control volume computation of the engine important control. If receiving the stop notice, the computation implementation determination unit 143 determines that the EPS control device 140 is not designated as the second control device.

Subsequently, referring to a flowchart of FIG. 13, a description will be given of the operation of the control system when the control volume computation unit 116 of the engine control device 110, the control volume computation unit 126 of the meter control device 120, the control volume computation unit 136 of the AT control device 130, and the control volume computation unit 146 of the EPS control device 140 are not defective, and the control volume related to the engine important control is accurately computed. First, it is assumed that the meter control device 120 is designated as the second control device that implements the control volume computation of the engine important control, and the control volume computation status detection unit 821 does not determine that the processing load is high, and does not instruct the engine control device 110 to change the second control device. Also, the operation mode of the engine control device 110 is set to the normal mode indicating that no defect is detected up to now.

First, when the important processing related to the control volume computation of the engine important control starts, the computation implementation notification unit 113 of the engine control device 110 confirms whether an instruction for change has been received from the selected meter control device 120, or not, in Step S901. In this situation, the computation implementation notification unit 113 determines that the instruction for change has not been received.

Then, in Step S504, the data collection unit 115 collects data necessary for the control volume computation of the engine important control, and stores the collected data in the data storage area 243 necessary for computation of the storage unit 114.

Subsequently, in Step S704, the data transceiver unit 112 transmits data necessary for the control volume computation of the engine important control to the meter control device 120. On the other hand, in the meter control device 120, the data transceiver unit 122 receives data necessary for the control volume computation of the engine important control from the engine control device 110, and therefore stores the received data in the data storage area 343 necessary for computation of the storage unit 124.

Then, in Step S506, the control volume computation unit 116 computes the control volume of the engine important control on the basis of data necessary for the control volume computation of the engine important control, which is stored in the storage unit 114, and the control volume computation procedure 232 of the engine important control. On the other hand, in the meter control device 120, the control volume computation unit 126 computes the control volume of the engine important control on the basis of data necessary for the control volume computation of the engine important control, which is stored in the storage unit 124, and the control volume computation procedure 232 of the engine important control. Then, the data transceiver unit 122 transmits the control volume of the engine important control to the engine control device 110.

Then, in Step S903, the data transceiver unit 112 receives the control volume of the engine important control transmitted from the meter control device 120.

Then, in Step S508, the comparator unit 117 confirms the operation mode of the engine control device 110. In this example, the operation mode is the normal mode.

Subsequently, in Step S509, the comparator unit 117 compares the control volume of the engine important control computed by the comparator unit 117 with the control volume of the engine important control received from the meter control device 120. In this example, the comparison result is identical.

Then, in Step S516, the engine control unit 118 executes the control of the engine unit 111 on the basis of the identical control volume of the engine important control.

Through the above operation of the control system, the control volume computation of the engine important control is also implemented by the meter control device 120 selected as the second control device, and the control volumes are compared with each other. If a comparison result is identical, the control of the engine unit 111 can be continued on the basis of the identical control volume.

Subsequently, referring to the flowchart of FIG. 13, a description will be given of the operation of the control system when the control volume computation unit 116 of the engine control device 110, the control volume computation unit 126 of the meter control device 120, the control volume computation unit 136 of the AT control device 130, and the control volume computation unit 146 of the EPS control device 140 are not defective, and the control volume related to the engine important control is accurately computed. In this example, in the computation volume difference second control device list 861 are recorded the difference frequency 0 of the meter control device 120, the difference frequency 1 of the AT control device 130, and the difference frequency 0 of the EPS control device 140.

First, when the important processing related to the control volume computation of the engine important control starts, the computation implementation notification unit 113 of the engine control device 110 confirms whether an instruction for change has been received from the selected meter control device 120, or not, in Step S901. In this situation, since the meter control device 120 becomes larger in the processing load, the change instruction unit 840 issues the instruction for change to the engine control device 110. Therefore, the computation implementation notification unit 113 determines that the instruction for change has been received.

Subsequently, in Step S902, the engine control device 110 notifies the meter control device 120 of the stop of the control volume computation of the engine important control through the computation implementation notification unit 113. Then, the engine control device 110 selects, from the computation volume difference second control device list 861, not the AT control device 130 whose difference frequency is 1, but the EPS control device 140 whose difference frequency is 0, and notifies the EPS control device 140 of the implementation of the control volume computation of the engine important control. In this example, because the computation implementation determination unit 123 of the meter control device 120 receives a notice to stop the control volume computation of the engine important control from the computation implementation notification unit 113 of the engine control device 110, the computation implementation determination unit 123 determines that the meter control device 120 is not designated as the second control device that implements the control volume computation of the engine important control. Also, the computation implementation determination unit 143 of the EPS control device 140 receives a notice to implement the control volume computation of the engine important control from the computation implementation notification unit 113 of the engine control device 110. Therefore, the computation implementation determination unit 143 determines that the EPS control device 140 is designated as the second control device that implements the control volume computation of the engine important control.

Then, in Step S504, the data collection unit 115 collects data necessary for the control volume computation of the engine important control, and stores the collected data in the data storage area 243 necessary for computation of the storage unit 114.

Subsequently, in Step S704, the data transceiver unit 112 transmits data necessary for the control volume computation of the engine important control to the EPS control device 140. On the other hand, in the EPS control device 140, the data transceiver unit 142 receives data necessary for the control volume computation of the engine important control from the engine control device 110, and therefore stores the received data in the data storage area 543 necessary for computation of the storage unit 144.

Then, in Step S506, the control volume computation unit 116 computes the control volume of the engine important control on the basis of data necessary for the control volume computation of the engine important control, which is stored in the storage unit 114, and the control volume computation procedure 232 of the engine important control. On the other hand, the EPS control device 140 computes the control volume of the engine important control on the basis of data necessary for the control volume computation of the engine important control, which is stored in the storage unit 144, and the control volume computation procedure 232 of the engine important control. Then, the data transceiver unit 142 transmits the control volume of the engine important control to the engine control device 110.

Then, in Step S903, the data transceiver unit 112 receives the control volume of the engine important control transmitted from the EPS control device 140.

The processing is advanced to Steps S508, S509, and S516. Those processing has the same processing contents as those described above, and therefore their description will be omitted.

Through the above operation of the control system, the control volume computation of the engine important control is also implemented by the meter control device 120 that is the second control device. If receiving an instruction for change from the second control device, since difference is not issued according to the computation volume difference second control device list 861, the meter control device 120 is switched to the EPS control device 140 that is the second control device higher in reliability, and computation is conducted. The control volumes are compared with each other, and if the comparison result is identical, the control of the engine unit 111 can be continued on the basis of the identical control volume.

Subsequently, referring to the flowchart of FIG. 13, a description will be given of the operation of the control system when the control volume computation unit 116 of the engine control device 110 is defective, and the control volume of the engine important control is not accurately computed. First, it is assumed that the meter control device 120 is designated as the second control device that implements the control volume computation of the engine important control. Also, it is not determined that the control volume computation status detection unit 821 is high in the processing load, and the meter control device 120 does not instruct the engine control device 110 to change the second control device. Also, it is assumed that the operation mode of the engine control device 110 is the normal mode indicating that no defect is detected up to no In this example, in the computation volume difference second control device list 861 are recorded the difference frequency 0 of the meter control device 120, the difference frequency 1 of the AT control device 130, and the difference frequency 0 of the EPS control device 140.

The processing of the engine control device 110 is advanced to Steps S901, S504, S704, S506, S903, and S508. Those processing is identical with the above-mentioned case in which no defect is detected, and therefore their description will be omitted.

Subsequently, in Step S509, the comparator unit 117 compares the control volume of the engine important control computed by the comparator unit 117 with the control volume of the engine important control received from the meter control device 120. In this example, the control volume computation unit 116 is defective, and the control volume of the engine important control is not accurately computed, and therefore the comparison result is different.

Subsequently, in Step S904, the engine control device 110 notifies the meter control device 120 of the stop of the control volume computation of the engine important control through the computation implementation notification unit 113. Then, the engine control device 110 selects, from the computation volume difference second control device list 861, not the AT control device 130 whose difference frequency is 1, but the EPS control device 140 whose difference frequency is 0, and notifies the EPS control device 140 of the implementation of the control volume computation of the engine important control. In this example, because the computation implementation determination unit 123 of the meter control device 120 receives a notice to stop the control volume computation of the engine important control from the computation implementation notification unit 113 of the engine control device 110, the computation implementation determination unit 123 determines that the meter control device 120 is not designated as the second control device that implements the control volume computation of the engine important control. Also, the computation implementation determination unit 143 of the EPS control device 140 receives a notice to implement the control volume computation of the engine important control from the computation implementation notification unit 113 of the engine control device 110. Therefore, the computation implementation determination unit 143 determines that the EPS control device 140 is designated as the second control device that implements the control volume computation of the engine important control.

Subsequently, in Step S708, the data transceiver unit 112 transmits data necessary for the control volume computation of the engine important control to the EPS control device 140. On the other hand, in the EPS control device 140, the data transceiver unit 142 receives data necessary for the control volume computation of the engine important control from the engine control device 110, and therefore stores the received data in the data storage area 543 necessary for computation of the storage unit 144. Then, the EPS control device 140 computes the control volume of the engine important control on the basis of data necessary for the control volume computation of the engine important control, which is stored in the storage unit 144, and the control volume computation procedure 232 of the engine important control. Then, the data transceiver unit 142 transmits the control volume of the engine important control to the engine control device 110.

Then, in Step S905, the data transceiver unit 112 receives the control volume of the engine important control transmitted from the EPS control device 140.

Subsequently, in Step S514, the comparator unit 117 compares the control volume of the engine important control computed by the comparator unit 117 with the control volume of the engine important control received from the EPS control device 140. In this example, the control volume computation unit 116 is defective, and the control volume of the engine important control is not accurately computed, and therefore the comparison result is again different.

Then, in Step S515, the comparator unit 117 determines that the control device of the comparator unit 117 is defective because the comparison result is again different, and sets the operation mode of the engine control device 110 to the defect mode.

Subsequently, in Step S907, the engine control unit 118 executes the control of the engine unit 111 on the basis of the preliminary control volume 851 of the engine important control prepared in advance.

Through the above operation of the control system, the control volume computation of the engine important control is also implemented by the meter control device 120 that is the second control device, and the control volumes are compared with each other. If a comparison result is different, the control volume computation is implemented by the EPS control device 140 that is another second control device, and the control volumes are again compared with each other to specify the defective control device. If the control device is not the control device of itself, the control of the engine unit 111 can be executed on the basis of the preliminary control volume of the engine important control prepared in advance.

Subsequently, referring to the flowchart of FIG. 13, a description will be given of the operation of the control system when the control volume computation unit 126 of the meter control device 120 is defective, and the control volume of the engine important control is not accurately computed. First, it is assumed that the meter control device 120 is designated as the second control device that implements the control volume computation of the engine important control. Also, it is not determined that the control volume computation status detection unit 821 is high in the processing load, and the meter control device 120 does not instruct the engine control device 110 to change the second control device. Also, it is assumed that the operation mode of the engine control device 110 is the normal mode indicating that no defect is detected up to now. In this example, in the computation volume difference second control device list 861 are recorded the difference frequency 0 of the meter control device 120, the difference frequency 1 of the AT control device 130, and the difference frequency 0 of the EPS control device 140.

The processing of the engine control device 110 is advanced to Steps S901, S504, S704, S506, S903, S508, S509, S904, S708, and S905. In this example, in Step S904, the EPS control device 140 is selected as the second control device. Those processing is identical with that in the above case where the control volume computation unit 116 of the engine control device 110 is defective, and therefore its description will be omitted.

Then, in Step S514, the comparator unit 117 compares the control volume of the engine important control computed by the comparator unit 117 with the control volume of the engine important control received from the EPS control device 140. In this example, since the control volume computation unit 116 of the engine control device 110 and the control volume computation unit 146 of the EPS control device 140 are not defective, the control volume of the engine important control is accurately computed, and the comparison result is identical.

Then, in Step S906, the comparator unit 117 adds the previously selected meter control device 120 different in the comparison result to the computation volume difference second control device list 861. In this example, the comparator unit 117 changes the difference frequency of the meter control device 120 from 0 to 1.

Then, in Step S516, the engine control unit 118 executes the control of the engine unit 111 on the basis of the identical control volume of the engine important control.

Through the above operation of the control system, the control volume computation of the engine important control is also implemented by the meter control device 120 that is the second control device, and the control volumes are compared with each other. If a comparison result is different, the control volume computation is implemented by the EPS control device 140 that is another second control device, and the control volumes are again compared with each other to specify the defective control device. If the control device is not the control device of itself, the control of the engine unit 111 can be continued on the basis of the identical control volume.

As described above, in the control system, if it is determined that the control volume of the engine important control, which is compared with the comparator unit 117 of the engine control device 110, is identical with the control volume of the engine important control, which is computed by the meter control device 120 that is the second control device, the engine unit 111 is controlled on the basis of the identical control volume of the important control. If it is determined that the control volume of the engine important control, which is compared with the comparator unit 117, is different therefrom, the control volume is again compared with the control volume of the engine important control, which is computed by the AT control device 130 or the EPS control device 140 which is the second control device. If the comparison result is identical, it is determined that the second control device compared previously is defective, and the engine unit 111 is controlled on the basis of the identical control volume of the important control. If the comparison result is different, it is determined that the control device of the comparator unit 117 is defective, and the engine unit 111 is controlled on the basis of the preliminary control volume 851 of the engine important control prepared in advance, thereby enabling the reliability of the control to be improved.

Also, in the control system, the control device that computes the control volume of defect is specified on the basis of the comparison results with the control volume of the engine important control that is implemented by the meter control device 120, the AT control device 130, or the EPS control device 140 each having a different object to be controlled and a different control processing. Thus, since there is no provision of the CPU or the control device only for detecting the defect, the reliability of the engine important control can be ensured while suppressing unnecessary costs.

Furthermore, in the control system, the meter control device 120, the AT control device 130, and the EPS control device 140, which are the second control device, are provided with the change instruction unit 820 and the control volume computation status detection unit 821, the change instruction unit 830 and the control volume computation status detection unit 831, and the change instruction unit 840 and the control volume computation status detection unit 841. As a result, the second control device can instruct the first control device to change the second control device that executes the control volume computation of the engine important control to another second control device according to the load status of the second control device. The load is dispersed without extremely applying the load of the control volume computation of the engine important control on one second control device, so that the reliability of the engine important control can be ensured.

Also, in the control system, the engine control device 110 is provided with the computation volume difference second control device list 861. With this configuration, only the second control device high in reliability which is not determined as defect is selected to implement the control volume computation of the engine important control. The engine unit 111 is controlled on the basis of the comparison result so that the reliability of the engine important control can be ensured.

As described above, according to the control system of the third embodiment of the present invention, in the first control device and the plurality of second control devices which are connected to the network, the first control device includes: the data transceiver unit that transmits and receives data through the network; the data collection unit that collects the control data necessary for computation of the control volume of the important control on the object to be controlled by the first control device, and allows the collected control data to be stored in the first storage unit; the first storage unit that stores the first control volume computation procedure for computing the control volume of the important control, and the control data; the first control volume computation unit that computes the control volume of the important control on the basis of the first control volume computation procedure and the control data which are stored in the first storage unit; the comparison unit that compares the control volume of the important control computed by the first control volume computation unit with the control volume of the important control computed by the second control device; the control unit that controls the object to be controlled on the basis of the comparison result by the comparison unit; the computation implementation notification unit that notifies the pre-determined second control device of the computation implementation and computation stop of the control volume of the important control through the network; and the computation volume difference second control device list that saves the second control device in which the result of comparing the control volume computation of the engine important control is different therein. The second control device includes: the data transceiver unit that transmits and receives data through the network; the control data saving unit that allows the control data received from the first control device through the network to be stored in the second storage unit; the second storage unit that stores the first control volume computation procedure, and the control data therein; the second control volume computation unit that computes the control volume of the important control on the basis of the stored first control volume computation procedure and control data; the computation implementation determination unit that determines computation implementation and computation stop of the control volume of the important control according to the instruction of the computation destination instruction unit; the control volume computation status detection unit that detects a state in which the control volume computation of the important control is difficult; and the change instruction unit that notifies the first control device of the change instruction notice for instructing a change of the second control device that computes the control volume of the important control.

With this configuration, the control system that can ensure the reliability of the control can be obtained with no increase in the scale of the control system such that two microcomputers having the same function are disposed within the control device, or two other control devices for detecting the defect are provided, and the control volume related to the important control, which is computed by the first control device, is compared with the control volume related to the important control, which is computed by the second control device, and if the comparison result is identical, the control is implemented with that value whereas if the comparison result is different, the second control device is changed to another second control device, the comparison is implemented, and it is determined whether the object to be controlled is controlled or not, on the basis of the result. Also, there can be obtained the control system that ensures the reliability of the control which suppresses unnecessary costs since there is no provision of the CPU or the control device only for detecting the defect.

In the above third embodiment, the control volume computation status detection unit issues the instruction for changing the second control device for conducting the control volume computation of the engine important control to another second control device according to the processing load of itself. However, the determination method is not limited to the processing load, but the same advantages are obtained even if the determination is conducted on the basis of the factor related to the computation implementation such as the memory usage.

Also, in the above first to third embodiments, the number of second control devices connected to the network 100 is two or three (two in the first and second embodiment, and three in the third embodiment). However, the present invention is not limited to this configuration.

Further, in the above first to third embodiments, the engine control device 110 is described as the first control device. Alternatively, the engine control device 110 may serve as the second control device for another control device while the engine control device 110 serving as the first control device. In this case, the control volume of the engine important control is compared with the control volume computed by another second control device, and the engine unit is controlled on the basis of the comparison result. The control volume of the important control of another control device is computed, and transmitted to the control device whereby the same advantages can be obtained.

Further, in the above first to third embodiments, the second control devices may be configured by the same member such that the control volume computation unit 116, the control volume computation unit 126, and the control volume computation unit 136 (in the third embodiment) can be each formed of, for example, a microprocessor manufactured by the same manufacturer with the same model No. In this case, the control volume can be more accurately compared, and the control of the engine unit 111 is executed on the basis of the result of comparing the control volume, thereby enabling the reliability of the control system to be improved.

Further, in the above first to third embodiments, the second control devices may be configured by the same member such that the storage unit 114, the storage unit 124, and the storage unit 134 (in the third embodiment) can be each formed of, for example, a memory manufactured by the same manufacturer with the same model No. With this configuration, the control volume computation procedure 232 of the engine important control may be stored in the same places of the respective memories. In this case, the control volume can be more accurately compared, and the control of the engine unit 111 is executed on the basis of the result of comparing the control volume, thereby enabling the reliability of the control system to be improved.

Further, in the above first to third embodiments, the second control devices may be configured by the same member such that the storage unit 114, the storage unit 124, and the storage unit 134 (in the third embodiment) can be each formed of, for example, a memory manufactured by the same manufacturer with the same model No. With this configuration, the data storage area 243 necessary for computation, the data storage area 343 necessary for computation, and the data storage area 443 necessary for computation (in the third embodiment) may be stored in the same places of the respective memories. In this case, the control volume can be more accurately compared, and the control of the engine unit 111 is executed on the basis of the result of comparing the control volume, thereby enabling the reliability of the control system to be improved.

Various modifications and alterations of this invention will be apparent to those skilled in the art without departing from the scope and spirit of this invention, and it should be understood that this is not limited to the illustrative embodiments set forth herein.

What is claimed is:

1. A control system including a first control device and at least two second control devices, which are each connected to a network, and control objects to be controlled different from each other, wherein each of the first control device and the at least two second control devices stores a control volume computation procedure for computing a control volume related to a pre-determined control on an object to be controlled by the first control device, wherein the first control device compares the control volume related to the pre-determined control computed on the basis of the control volume computation procedure stored in the first control device with the control volume related to the pre-determined control computed on the basis of the control volume computation procedure stored in one of the at least two second control devices, and if the respective compared control volumes are identical with each other, the first control device controls the object to be controlled by the first control device on the basis of the control volumes, and wherein if the respective compared control volumes are different from each other, the first control device stops the computation by the one second control device that computes the compared control volume, computes control volume related to the pre-determined control on the basis of the control volume computation procedure stored in the other second control device, compares control volume related to the pre-determined control computed on the basis of the control volume computation procedure stored in the first control device with control volume related to the pre-determined control computed by the other second control device, and controls the object to be controlled by the first control device on the basis of a comparison result.

2. A control system including a first control device and at least two second control devices, which are each connected to a network, and control objects to be controlled different from each other, wherein the first control device comprises:

a data transceiver unit that transmits and receives data through the network;

a first storage unit that stores a first control volume computation procedure for computing a control volume related to a pro-determined control on an object to be controlled by the first control device, and control data for computing the control volume therein;

a data collection unit that collects the control data for the object to be controlled by the first control device, and allows the collected control data to be stared in the first storage unit;

a first control volume computation unit that computes the control volume related to the pre-determined control on the object to be controlled by the first control device on the basis of the first control volume computation procedure and the control data which are stored in the first storage unit;

a comparison unit that compares the control volume related to the pre-determined control computed by the first control volume computation unit with the control volume related to the pre-determined control computed by the second control device;

a control unit that controls the object to be controlled by the first control device on the basis of a comparison result by the comparison unit; and an computation implementation notification unit that notifies the second control device of implementation of computation of the control volume related to the pre-determined control and stop of the computation thereof through the network, wherein the second control device comprises:

a data transceiver unit that transmits and receives data through the network;

a second storage unit that stores the first control volume computation procedure, and the control data therein;

a control data saving unit that allows the control data received from the first control device through the network to be stored in the second storage unit;

a second control volume computation unit that computes the control volume related to the pre-determined control on the basis of the first control volume computation procedure and the control data which are stored in the second storage unit; and an computation implementation determination unit that determines whether compute or stop to compute the control volume related to the pre-determined control on the basis of the notice from an computation destination instruction unit in the first control device, wherein the first control device compares the control volume related to the pre-determined control computed on the basis of the control volume computation procedure stored in the first storage unit by the first control device with the control volume related to the same pre-determined control computed on the basis of the control volume computation procedure stored in the second storage unit by one of the at least two second control devices through the comparison unit, and if the respective compared control volumes are identical with each other, the first control device controls the object to be controlled by the first control device on the basis of the control volumes, and wherein if the respective compared control volumes are different from each other, the first control device stops the one second control device that computes the compared control volume computing the control volumes by the computation implementation notification unit, lets the other second control device computes the control volume related to the pre-determined control on the basis of the control volume computation procedure stored themself by the computation implementation notification unit, compares the control volume related to the pre-determined control computed by the first control device with control volume related to the pre-determined control computed by the other second control device, and controls the object to be controlled by the first control device on the basis of a comparison result.

3. The control system according to claim 1,
wherein, as a result of comparison of the control volume related to the pre-determined control computed by the first control device with the control volume related to the pre-determined control computed by the another second control device, if the respective compared control volumes are identical with each other, the first control device controls the object to be controlled by the first control device on the basis of the control volume, and wherein if the respective compared control volumes are different from each other, the first control device does not control the object to be controlled by the first control device.

4. The control system according to claim 1,
wherein, as a result of comparison of the control volume related to the pre-determined control computed by the first control device with the control volume related to the pre-determined control computed by the another second control device, if the respective compared control volumes are identical with each other, the first control device controls the object to be controlled by the first control device on the basis of the control volume, and wherein if the respective compared control volumes are different from each other, the first control device controls the object to be controlled by the first control device on the basis of the control volume computed by the another second control device.

5. The control system according to claim 1,
wherein, as a result of comparison of the control volume related to the pre-determined control computed by the first control device with the control volume related to the pre-determined control computed by the another second control device, if the respective compared control volumes are identical with each other, the first control device controls the object to be controlled by the first control device on the basis of the control volume, and wherein if the respective compared control volumes are different from each other, the first control device controls the object to be controlled by the first control device on the basis of a pre-determined control volume.

6. The control system according to claim 1,
wherein the first control device includes a timer unit that measures an computation time for computing the control volume by the second control device, and wherein when the timer unit detects that the computation time of the second control device that implements computation of the control volume reaches a pre-determined time, the first control device changes from the second control device that implements the computation to another second control device to conduct computation.

7. The control system according to claim 1,
wherein the first control device includes an implementation frequency counting unit that detects the implementation frequency of the control volume computation in the second control device, and wherein when the implementation frequency counting unit detects that the implementation frequency of the second control device that implements computation of the control volume reaches a pre-determined frequency, the first control device changes from the second control device that implements the computation to another second control device to conduct computation.

8. The control system according to claim 1,
wherein the second control device includes a control volume computation status detection unit that detects a computation status of the control volume in the second control device, and a change instruction unit that transmits, to the first control device, an instruction for changing the computation of the control volume from the second control device to another second control device, wherein if the control volume computation status detection unit detects that the computation implementation of the control volume by the control volume computation status detection unit is difficult, the second control device notifies the first control device of an instruction for the change by the change instruction unit, wherein the first control device changes the second control device to another second control device to implement the computation of the control volume on the basis of the instruction from the second control device.

9. The control system according to claim 1, wherein the first control device includes a selective second control device computation list that records an order of the second control device that computes the control volume, and wherein when changing the second control device that computes the control volume to another second control device, the first control device selects the second control device on the basis of the selective second control device computation list (234).

10. The control system according to claim 1, wherein the first control device includes a second control device select frequency list that holds a select frequency of the second control device that computes the control volume, wherein the first control device adds the select frequency of the second control device that computes the control volume to the second control device select frequency list, and wherein when changing the second control device that computes the control volume related to the pre-determined control to another second control device, the first control device selects the second control device on the basis of the second control device select frequency list.

11. The control system according to claim 1, wherein the first control device includes an computation volume difference second control device list, wherein when it is determined that a result of comparing the control volume of the pre-determined control is different, and a result of comparing the control volume of the second control device changed next with the control volume related to the pre-determined control is identical, the first control device adds the previous second control device to the computation volume difference second control device list, and wherein when changing the second control device that computes the control volume related to the pre-determined control to another second control device, the first control device selects the second control device on the basis of the computation volume difference second control device list.

12. The control system according to claim 2, wherein the first control volume computation unit and the second control volume computation unit are each configured by a microcomputer having the same configuration.

13. The control system according to claim 2, wherein the first storage unit and the second storage unit is each configured by a memory having the same configuration, and the first control volume computation procedure and the first control data are stored in identical places of the first and second storage units, respectively.

\* \* \* \* \*